US008483100B2

(12) United States Patent
Bennett et al.

(10) Patent No.: US 8,483,100 B2
(45) Date of Patent: Jul. 9, 2013

(54) COMMUNICATION DEVICE SUPPORTING BOTH INTERNET AND PUBLIC SWITCHED TELEPHONE NETWORK TELEPHONY

(75) Inventors: James D. Bennett, Hroznetin (CZ); Jeyhan Karaoguz, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 928 days.

(21) Appl. No.: 11/348,632

(22) Filed: Feb. 7, 2006

(65) Prior Publication Data
US 2007/0183440 A1 Aug. 9, 2007

Related U.S. Application Data

(60) Provisional application No. 60/736,889, filed on Jan. 14, 2005.

(51) Int. Cl.
*H04L 12/28* (2006.01)
*H04L 12/66* (2006.01)
(52) U.S. Cl.
USPC ........... 370/261; 370/353; 370/356; 370/389; 370/419
(58) Field of Classification Search
USPC .......................................................... 370/419
See application file for complete search history.

(56) References Cited

U.S. PATENT DOCUMENTS

| | | | | |
|---|---|---|---|---|
| 5,903,558 A * | 5/1999 | Jones et al. | | 370/351 |
| 6,243,373 B1 * | 6/2001 | Turock | | 370/352 |
| 6,304,637 B1 * | 10/2001 | Mirashrafi et al. | | 379/88.17 |
| 6,310,941 B1 * | 10/2001 | Crutcher et al. | | 379/88.17 |
| 6,343,115 B1 * | 1/2002 | Foladare et al. | | 379/88.17 |
| 6,374,102 B1 * | 4/2002 | Brachman et al. | | 455/422.1 |
| 6,377,570 B1 * | 4/2002 | Vaziri et al. | | 370/352 |
| 6,389,005 B1 * | 5/2002 | Cruickshank | | 370/352 |
| 6,404,764 B1 * | 6/2002 | Jones et al. | | 370/352 |
| 6,498,791 B2 * | 12/2002 | Pickett et al. | | 370/353 |
| 6,510,219 B1 * | 1/2003 | Wellard et al. | | 379/221.01 |
| 6,574,216 B1 * | 6/2003 | Farris et al. | | 370/352 |

(Continued)

FOREIGN PATENT DOCUMENTS

| | | |
|---|---|---|
| CN | 1652560 A | 2/2004 |
| CN | 1592257 A | 4/2004 |

(Continued)

OTHER PUBLICATIONS

Partial EP Search Report dated Mar. 31, 2008.

*Primary Examiner* — John Blanton
(74) *Attorney, Agent, or Firm* — Garlick & Markison; Holly L Rudnick

(57) ABSTRACT

A voice communication device, supporting both Internet and public switched telephone network telephony, performs call session hand off between Internet and public switched telephone networks. Hand off, with or without user confirmation, may be half or full duplex, yielding common and differing incoming and outgoing call session pathways. In addition to mid-call hand offs, hand off may also be performed as part of the call session setup. Information regarding the destination network is exchanged on the network from which the hand off will occur. Voice communication devices are each configured with a plurality of communication interfaces including a public switched telephone network interface and an Internet interface. Basic full-duplex operations include immediate and mid-call hand offs between the public switched telephone network and Internet. Mixed pathway communication and handoffs using partly Internet and partly public switched telephone network are also contemplated.

19 Claims, 10 Drawing Sheets

U.S. PATENT DOCUMENTS

| | | | |
|---|---|---|---|
| 6,584,094 B2 * | 6/2003 | Maroulis et al. | 370/352 |
| 6,636,506 B1 * | 10/2003 | Fan | 370/356 |
| 6,654,456 B1 * | 11/2003 | Mandalia et al. | 379/220.01 |
| 6,704,303 B1 * | 3/2004 | Bowman-Amuah | 370/352 |
| 6,754,708 B1 * | 6/2004 | Sabatier et al. | 709/227 |
| 6,763,020 B1 * | 7/2004 | Hon | 370/356 |
| 6,810,036 B1 * | 10/2004 | Dang et al. | 370/356 |
| 6,816,464 B1 * | 11/2004 | Scott et al. | 370/252 |
| 6,870,827 B1 * | 3/2005 | Voit et al. | 370/352 |
| 6,873,689 B1 * | 3/2005 | Butler et al. | 379/93.05 |
| 6,907,034 B1 * | 6/2005 | Begis | 370/354 |
| 6,934,258 B1 * | 8/2005 | Smith et al. | 370/238 |
| 6,980,643 B2 * | 12/2005 | Chen et al. | 379/377 |
| 7,006,614 B2 * | 2/2006 | Feinberg et al. | 379/164 |
| 7,012,898 B1 * | 3/2006 | Farris et al. | 370/252 |
| 7,042,998 B2 * | 5/2006 | Zino et al. | 379/220.01 |
| 7,155,003 B2 * | 12/2006 | Fleming et al. | 379/221.13 |
| 7,295,844 B1 * | 11/2007 | Moon et al. | 455/445 |
| 7,379,455 B2 * | 5/2008 | Pickett | 370/389 |
| 2001/0056466 A1 * | 12/2001 | Thompson et al. | 709/204 |
| 2002/0042812 A1 | 4/2002 | Spencer | |
| 2002/0057672 A1 | 5/2002 | Komuro | |
| 2002/0064149 A1 * | 5/2002 | Elliott et al. | 370/352 |
| 2002/0065922 A1 | 5/2002 | Shastri | |
| 2002/0114439 A1 * | 8/2002 | Dunlap | 379/219 |
| 2002/0141386 A1 * | 10/2002 | Minert et al. | 370/352 |
| 2002/0191760 A1 * | 12/2002 | Wattwood et al. | 379/93.01 |
| 2003/0031169 A1 * | 2/2003 | Emerson, III | 370/352 |
| 2003/0043787 A1 * | 3/2003 | Emerson, III | 370/352 |
| 2003/0043974 A1 * | 3/2003 | Emerson, III | 379/88.13 |
| 2003/0128697 A1 * | 7/2003 | Narain et al. | 370/352 |
| 2003/0214573 A1 * | 11/2003 | Oh | 348/14.01 |
| 2004/0003050 A1 * | 1/2004 | Lewis | 709/208 |
| 2004/0022235 A1 * | 2/2004 | Vaziri et al. | 370/352 |
| 2004/0063445 A1 * | 4/2004 | Vaananen | 455/466 |
| 2004/0170181 A1 | 9/2004 | Bogdon et al. | |
| 2005/0025294 A1 | 2/2005 | Matsuhashi | |
| 2005/0043022 A1 * | 2/2005 | Okon et al. | 455/422.1 |
| 2005/0091407 A1 * | 4/2005 | Vaziri et al. | 709/246 |
| 2005/0185621 A1 | 8/2005 | Sivakumar et al. | |
| 2005/0185632 A1 | 8/2005 | Draves, Jr. et al. | |
| 2005/0220045 A1 * | 10/2005 | Lin | 370/313 |
| 2006/0034266 A1 * | 2/2006 | Harris et al. | 370/356 |
| 2007/0049329 A1 * | 3/2007 | Mayer et al. | 455/552.1 |
| 2007/0160034 A1 * | 7/2007 | Koretsky | 370/352 |
| 2007/0297349 A1 * | 12/2007 | Arkin | 370/255 |

FOREIGN PATENT DOCUMENTS

| | | |
|---|---|---|
| EP | 0963082 A | 12/1999 |
| EP | 1408651 A | 4/2004 |
| EP | 1511282 A1 | 3/2005 |
| EP | 1517575 A2 | 3/2005 |
| EP | 1589781 A | 10/2005 |
| EP | 1622315 A | 2/2006 |
| WO | WO 00/14919 A | 3/2000 |
| WO | WO 01/35585 A | 5/2001 |
| WO | WO 01/58101 A | 8/2001 |
| WO | 2004023740 A | 3/2004 |
| WO | 2004097594 A | 11/2004 |

\* cited by examiner

COMMUNICATION DEVICE SUPPORTING BOTH INTERNET AND PUBLIC SWITCHED TELEPHONE NETWORK TELEPHONY

CROSS REFERENCES TO RELATED APPLICATIONS

The present application claims priority to U.S. Provisional Application Ser. No. 60/736,889 filed Nov. 14, 2005, which is incorporated herein by reference in its entirety.

The present application is a related to Utility application Ser. No. 11/349,292 filed on even date herewith, and entitled "VOICE COMMUNICATION DEVICE WITH PSTN AND INTERNET PATHWAY ANALYSIS, SELECTION AND HANDOFF," (BP5095.1).

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

This invention generally relates to voice communication systems.

2. Related Art

Public switched telephone network and Internet telephony voice communication devices are in wide spread use. A public switched telephone network telephony voice communication device uses a desktop or cordless telephone to make calls to a remote terminal. Further, cell phones utilize cellular networks and public switched telephone network to make calls to distant remote terminals.

Internet voice communication utilizes computers and Internet connections to make calls to remote locations. Internet voice communication devices include a personal or laptop computer, a headset and microphone or stand alone Internet phones. Typically, Internet phones allow the users to make calls to a remote desktop, cordless or cell phone. Today Internet calls are cost effective when compared to a public switched telephone network telephone call, especially, in case of a long distance call.

Among combined public switched telephone network/Internet voice communication devices that are available today are desktop, cordless phones that independently support Internet telephony and public switched telephone networks. An example of such devices, a Du@lphone, is produced by RTX Telecom A/S of Denmark. These phones comprise a handset that wirelessly communicates with a base unit. The base unit attaches via an RJ11 connector to the public switched telephone network, and via a universal serial bus (USB) port to a personal computer (PC). Once connected, the handset can place or receive either a typical public switched telephone network call or an Internet based call through the USB port and via the personal computer's Internet interface. In such devices, Internet and public switched telephone network calls operate independently.

In Internet telephony, quality of the communication pathway is a concern, especially, when low transfer rate modems are used. When an Internet call becomes inaudible or noisy, the user has to disconnect, i.e., terminate the call, and try again at another time. Similarly, public switched telephone network telephone calls may not provide acceptable voice quality in certain situations such as when calling a remotely located terminal. When experiencing unacceptable voice quality, the user has to terminate the public switched telephone network telephone call and try again with hopes of establishing acceptable quality.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the Claims.

In accordance with the present invention, a voice communication device supports both Internet telephony and public switched telephone network telephony. The voice communication device consists of a user interface, memory, public switched telephone network interface, Internet interface, and processing circuitry. Public switched telephone network and Internet interfaces support public switched telephone network telephony and Internet telephony respectively. The processing circuitry is communicatively coupled to the user interface, public switched telephone network interface and packet switched network interface, and performs one of four basic handoff operations, among other functionalities.

The first among the operations performed by the processing circuitry is setting up a call with a remotely located terminal via a public switched telephone network communication pathway and determining if an Internet communication pathway is available for servicing the call. Then, the processing circuitry determines the quality of the Internet communication pathway. When the quality of the Internet communication pathway compares favorably to a quality threshold, the processing circuitry services the call via the Internet communication pathway and discontinues use of the public switched telephone network communication pathway. The second operation performed by the processing circuitry is setting up a call with a remotely located terminal via a public switched telephone network communication pathway and servicing the call via public switched telephone network communication pathway. During the mid-call, either because of a user input or automatically based upon quality threshold and cost considerations, the processing circuitry determines if an Internet communication pathway is available for servicing the call. Then, the handoff to an Internet communication pathway takes place, similar to the first operation mentioned above. In a third operation, the processing circuitry sets up a call with a remotely located terminal via an Internet communication pathway. Further, the processing circuitry determines if a public switched telephone network communication pathway is available for servicing the call. Then, the processing circuitry determines the quality of the public switched telephone network communication pathway. When the quality of the public switched telephone network communication pathway compares favorably to a quality threshold, the processing circuitry services the call via the public switched telephone network communication pathway and discontinues use of the Internet communication pathway. Lastly, in a fourth operation, the processing circuitry sets up a call with a remotely located terminal via an Internet communication pathway and services the call via Internet communication pathway. During the mid-call, either because of a user input or automatically based upon quality threshold and cost considerations, the processing circuitry determines if a public switched telephone network communication pathway is available for servicing the call. Then, the handoff to a public switched telephone network communication pathway takes place, similar to the third operation mentioned above. The processing circuitry performs these four operations in conjunction with the public switched telephone network interface and Internet interface. In the second and fourth operations of mid-call handoff, the processing circuitry identifies a dead zone for handoff. Mixed pathway communication and handoffs using partly Internet and partly public switched telephone network are also contemplated.

The user interface of the voice communication device consists of a handset, keypad interface, wireless headset interface and display. The display is operable to display destination telephone number/IP address and retrieved telephone number/IP address, display communication pathway of either Internet or public switched telephone network being used, indicate quantitatively the quality of the second communication pathway used and indicate when the quality of the second communication pathway used is below quality threshold. The keypad interface consists of a key, among other keys, to handoff between Internet and public switched telephone network communication pathways (HANDOFF key).

Features and advantages of the present invention will become apparent from the following detailed description of the invention made with reference to the accompanying drawings.

DETAILED DESCRIPTION OF THE INVENTION

Figure 1:
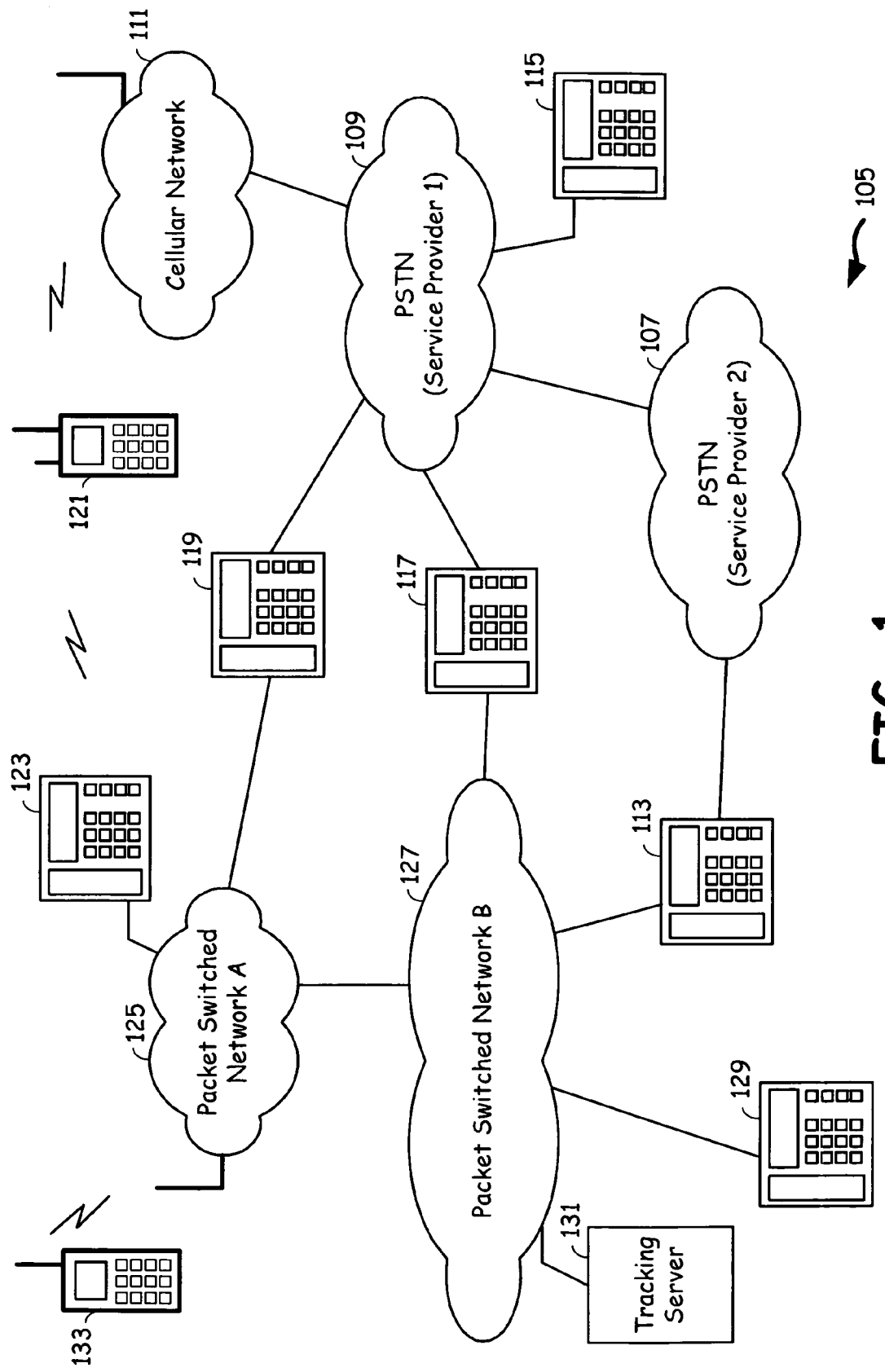
FIG. 1 is a block diagram illustrating an embodiment of voice communication devices that support both Internet and public switched telephone network telephony, in accordance with the present invention.

FIG. 1 is a block diagram 105 illustrating an embodiment of voice communication devices that support both Internet and public switched telephone network telephony, in accordance with the present invention. More specifically, in a packet switched and public switched telephone network service provider's networks 105, both of a packet switched network and public switched telephone network service provider's network provide services to each of the voice communication devices that support both Internet and public switched telephone network telephony simultaneously. Packet switched network A 125 and packet switched network B 127 are Internet service provider's networks that support Internet phones while public switched telephone network service provider's network 2 107 and public switched telephone network service provider's network 1 109 provide service to the conventional desktop or cordless phones. The cellular network 111 supports cell phones such as 121. Voice communication devices that support both Internet and public switched telephone network telephony include phones 113, 117, 119 and 121. The voice communication devices that support both Internet and public switched telephone network telephony may either be desktop/cordless phones 113, 117 and 119 or cell phones 121. FIG. 1 also shows Internet communication devices 123, 129 and 133 that support Internet telephony alone and a public switched telephone network communication device 115 that supports public switched telephone network telephony alone, communicatively coupled to their respective packet switched network or public switched telephone network service provider's networks 109, 127 and 125. A tracking server 131 allows location tracking of the Internet communication devices.

The voice communication device that supports both Internet and public switched telephone network telephony, here onwards referred to simply as the dual voice communication device 113, 117, 119 or 121 throughout the specifications, is communicatively coupled to the packet switched networks A or B 125 or 127 via a wired Local Area Network (LAN) or Wireless Local Area Network (WLAN). The coupling between dual voice communication device 113, 117, 119 or 121 and LAN or WLAN may occur via a router, cable modem, satellite modem, switch or hub. The dual voice communication device 113, 117, 119 or 121 is also simultaneously communicatively coupled to the public switched telephone network service provider's networks 1 or 2 107 or 109 via a line cord or wirelessly.

The respective service providers assign each of the dual voice communication devices 113, 117, 119, or 121 with an Internet Protocol (IP) address and a public switched telephone network telephone number. The IP address enables communication using the Internet communication pathway and the telephone number enables communication using public switched telephone network communication pathway.

Figure 4:
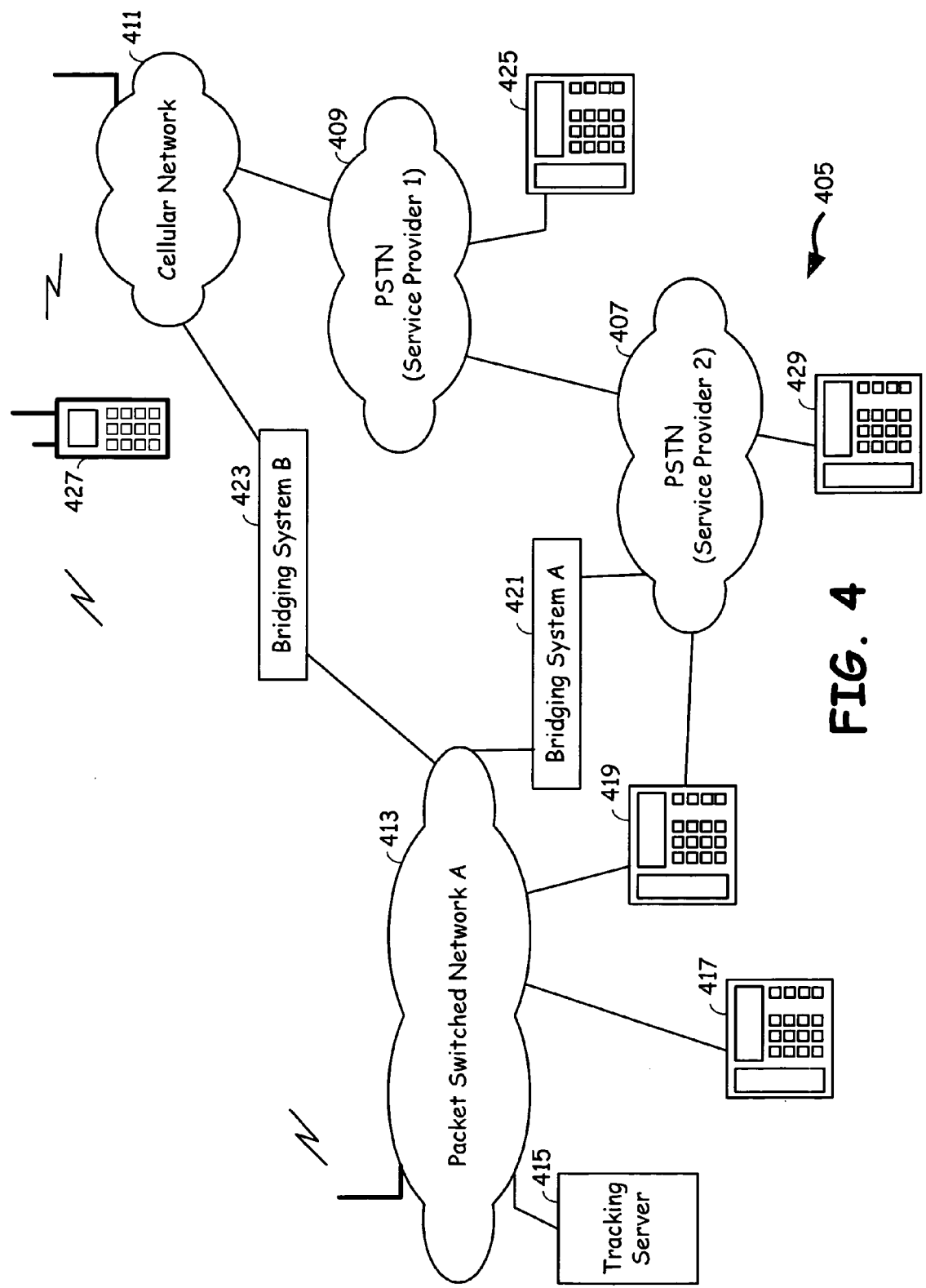
FIG. 4 is a block diagram illustrating an embodiment of voice communication devices that support both Internet and public switched telephone network telephony in which bridging systems allow public switched telephone network-to-Internet and Internet telephone-to-public switched telephone network voice communications.

Generally, regarding the salient feature of the dual voice communication device 113, 117, 119 or 121, a processing circuitry incorporated into the device (described with reference to the FIG. 5) performs one of four operations, prior to or during a call. The four operations are immediate public switched telephone network to Internet, mid-call public switched telephone network to Internet, immediate Internet to public switched telephone network, and mid-call Internet to public switched telephone network communication pathway handoff. The processing circuitry performs these four operations in conjunction with the public switched telephone network interface and packet switched network interface (described with reference to the FIG. 5), which are also incorporated into the dual voice communication device 113, 117, 119 or 121. Note that these four basic operations are end-to-end handoff operations, that is, they use either an end-to-end Internet communication pathway or end-to-end public switched telephone network communication pathway. In addition to these four basic operations, the processing circuitry also performs mixed path handoff operations, as described with reference to the FIG. 4, provides supplemental pathway support, and, may provide either different call pathways for each phone's generated call data, splitting the call data by type (e.g., audio versus video) across multiple pathways, or combinations thereof. Although not mentioned exclusively in the following text, each unbroken segment of a voice communication/video/data exchange via a single communication pathway is herein described as a calling session.

The first among these four basic operations is an immediate public switched telephone network to Internet communication pathway handoff. This operation starts with the processing circuitry setting up a call with a remotely located terminal via a public switched telephone network communication pathway and then handing off to an Internet communication pathway. The user initiates this by lifting handset of the dual voice communication device 113, 117, 119 or 121. Further, by pressing of the HANDOFF key incorporated into the keypad (described with reference to the FIG. 6) of the dual voice communication device 113, 117, 119 or 121, the processing circuitry identifies user's intent for a handoff. Then, the user dials the telephone number of a remote terminal. The processing circuitry then determines if an Internet communication pathway is available for servicing the call. Once an Internet communication pathway is found, the processing circuitry determines the quality of the pathway. When the quality of the Internet communication pathway compares favorably to a quality threshold (which may be preset by the user), the processing circuitry services the call via the Internet communication pathway and discontinues use of the public switched telephone network communication pathway.

Alternatively, an incoming public switched telephone network call could operate conventionally, while the recipient that has Internet functionality could attempt to send reply signaling without knowing the capability of the calling phone before delivering a ring signal. No matter how it occurs, Internet support information is exchanged between a dual voice communication device and destination dual communication device that each support both Internet and public switched telephone network telephony, such as the telephones 113, 117, 119 or 121. Once that occurs, the dual voice communication device identifies the handoff and other capabilities possibly before the destination communication device even begins to ring—which may never occur if the dual voice communication device or user thereof decides to abort the attempt in view of identified insufficiencies in or lack of capabilities. Again, for example, if destination communication device is standard public switched telephone network phone with no Internet support, then public switched telephone network to public switched telephone network is established in traditional way automatically or with prompting and acceptance by the caller that handoff is not possible.

For example, this situation may arise when the user decides to make a long distance call to a remote terminal via public switched telephone network communication pathway knowing that public switched telephone network long distance charges are high. The user may be aware of the fact that the remote terminal is also a dual voice communication device 113, 117, 119 or 121 and that using Internet communication pathway is cost effective, but may not know the IP address of the remote terminal. In this case, the user may decide to initiate a call using public switched telephone network communication pathway and press a HANDOFF key of the dual voice communication device 113, 117, 119, or 121 before dialing the telephone number of the remote terminal. This allows the user to communicate long distance cost effectively. Other user considerations in choosing an immediate public switched telephone network to Internet communication pathway handoff may be, for example: (a) the quality of the public switched telephone network communication pathway; (b) disturbances in one of the communication device's speakers; or (c) the user's attempt to call via Internet communication pathway, using the IP address of the remote terminal may be rejected, for some reason. In addition, the user may enable automatic handoff, with quality and cost considerations preset, in which case the processing circuitry decides on the pathway automatically at an appropriate time and determines which mode of operation is appropriate.

The second basic operation is mid-call public switched telephone network to Internet communication pathway handoff. In this operation, the processing circuitry sets up a call with a remotely located terminal via a public switched telephone network communication pathway, services the call via public switched telephone network communication pathway, and while continuing to service the public switched telephone network call, switches to an Internet communication pathway. The user initiates this by lifting the handset, by dialing the telephone number of a remote terminal of the dual voice communication device 113, 117, 119 or 121. Then, while continuing to communicate with the user of the remote terminal presses the HANDOFF key incorporated into the keypad (described with reference to the FIG. 5). Then, the processing circuitry determines if an Internet communication pathway is available for servicing the call. Then, the handoff to an Internet communication pathway takes place, similar to the first operation mentioned above.

Alternatively, during the mid-call, the processing circuitry may initiate this operation automatically without the HANDOFF key press, based upon quality threshold and cost considerations. The response to a HANDOFF key press is user configurable from a fully automatic mode to a very user interactive mode. For example, in a fully automatic mode, so long as minimum thresholds of quality/cost are met, a press of the HANDOFF key would result in automatic handoff of any part or all of the current caller link, backbone portion(s), and receiver link. In a semi-automatic configuration, the processing circuitry may only ask for user confirmation of the handoff by caller and/or receiving party beforehand. A manual configuration on the other hand, involves the caller and/or receiving party's participation in the entire process including having a visualization or textual readout of current pathway performance, quality and cost and all other possible pathway performance, quality and costs for manual selection for handover. Although set to a factory default, such configurations of HANDOFF key operation may be altered through: 1) screen and keypad interaction with the phone; 2) software or firmware downloads; and 3) over the air or wire instructions or updates.

The handoff to an Internet communication pathway, in this case, takes place in a dead zone. This may happen simultaneously, with both dual voice communication devices 113, 117, 119, or 121 handing off to Internet communication pathway simultaneously. Alternatively, the handing off may happen with one dual voice communication device 113, 117, 119 or 121 at a time with each seeking its own dead zone for transition. For example, the handoff may take place during a pause between words communicated, which the processing circuitry detects in association with the microphone output, without distracting the user from the conversation. When the handoff is not automatic, the processing circuitry may prompt each of the users to press HANDOFF key to accept the handoff, based upon the pre-programmed instructions.

For example, the user may decide to communicate using the public switched telephone network communication pathway by dialing a remote terminal, without being aware of the fact that the remote terminal is a dual voice communication device 113, 117, 119, or 121. During the communication, upon the user realizing that the remote terminal is also a dual voice communication device 113, 117, 119 or 121 (after being informed by the recipient party), the user may decide to switch to an Internet communication pathway and thus making the call cost effective. Other considerations of the user in choosing a mid-call public switched telephone network to Internet handoff may include quality of the public switched telephone network communication pathway or the remote terminal not being online.

In an automatic mode, the processing circuitry may utilize the caller ID of the destination communication device to identify the functionalities of the destination communication device. For example, upon pickup, a dual voice communication device 113, 117, 119 or 121, and/or destination dual communication device sends a very short modulated "audible" signal (like a fax tone) to indicate to the other phone that capabilities beyond public switched telephone network to public switched telephone network exist. The modulation may contain a current IP address or a handle through which an IP address may be obtained. The handle comprises a unique device identifier and may further comprise an identifier used to locate the service provider for IP address lookup. Using the caller ID, either the handle or the current IP address of the caller is sufficient for the destination communication device to use an Internet pathway to communicate with the dual voice communication device 113, 117, 119, or 121. Either the Caller ID industry standard may be used in its current form to deliver the IP address/handle in place of the calling telephone number and/or calling party name, or it may be modified to fully support the IP address/handle in addition to the number/name. In the absence of a reply tone from the destination communication device, the processing circuitry at least temporarily concludes (perhaps incorrectly) that destination communication device does not support both Internet and public switched telephone network telephony. Later however, if the destination communication device merely ignored the tone or if the destination device does not support such tone functionality, the destination device may initiate the process using the same or other technique.

The processing circuitry may determine the IP address of the remote terminal, in first and second operations, using one of the following approaches: (a) retrieving from the memory, which may contain an IP address associated with the telephone number of the remote terminal; (b) retrieving from the destination communication device's memory via the public switched telephone network communication pathway; (c) receiving from the user of the communication device using the keypad interface or speech and voice recognition; (d) receiving from the user of the destination communication device via the public switched telephone network communication pathway, using the keypad interface or speech and voice recognition; or (e) retrieving from a location tracking server, by using the telephone number as a handle registered with the tracking server. Besides these logical approaches, the processing circuitry may employ other approaches to identify the IP address of the remote terminal. For example, utilizing the caller ID service of the public switched telephone network service provider, which may also contain the IP addresses associated with the dual voice communication devices.

The third basic operation is an immediate Internet to public switched telephone network communication pathway handoff. In this operation, the processing circuitry sets up a call with a remotely located terminal via an Internet communication pathway and then switches to a public switched telephone network communication pathway. The user initiates this operation by lifting the handset and pressing the HANDOFF key (described with reference to the FIG. 6) of the dual voice communication device. Then, the user inputs an IP address of the remote terminal using the keypad interface (such as the one shown in FIG. 5). Alternatively, the user may use the phone book to enter the IP address or the processing circuitry may use a handle phonebook to access the current IP address. The processing circuitry, identifying that the HANDOFF key has been pressed before inputting the IP address, determines if a public switched telephone network communication pathway is available for servicing the call. Then, the processing circuitry determines the quality of the public switched telephone network communication pathway. When the quality of the public switched telephone network communication pathway compares favorably to a quality threshold (which may be set by the user), services the call via the public switched telephone network communication pathway and discontinues use of the Internet communication pathway.

For example, this situation may arise when the user is unaware of which communication pathway, among Internet and public switched telephone network communication pathways, provides better quality of communication when the communication is important, such as a business call for example. The user may also keep the consideration of cost effectiveness. Other situations may also arise such as the user not knowing the telephone number of the remote terminal, when the user would like to communicate via public switched telephone network communication pathway.

Lastly, the fourth basic operation is a mid-call Internet to public switched telephone network communication pathway handoff. In the fourth operation, the processing circuitry sets up a call with a remotely located terminal via an Internet communication pathway and services the call via Internet communication pathway for some period. The user initiates this by lifting the handset, by inputting IP address of the remote terminal via keypad interface of the dual voice communication device 113, 117, 119, or 121. Then, while continuing to communicate with the user of the remote terminal presses the HANDOFF key incorporated into the keypad interface (described with reference to the FIG. 6). Alternatively, during the mid-call, the processing circuitry may initiate this operation automatically without the HANDOFF key press, based upon quality threshold and cost considerations. Then, the handoff to a public switched telephone network communication pathway takes place, similar to the third operation mentioned above.

The handoff to a public switched telephone network communication pathway takes place in a dead zone, without distracting communication of the users of the voice communication device. This could happen simultaneously, with both dual voice communication devices handing off to a public switched telephone network communication pathway simultaneously. Alternatively, handoff may occur with one telephony device at a time, each seeking its own dead zone for transition. When the handoff is not automatic, the processing circuitry may prompt each of the users to press HANDOFF key to accept the handoff, based upon the pre-programmed instructions.

For example, the user may have initiated a phone call using an Internet communication pathway, but may find while using the phone that the quality is unacceptable. Then, the user may initiate handoff from Internet to public switched telephone network communication pathway by pressing the HANDOFF key or an automatic handoff may take place.

The processing circuitry, in third and fourth operations, may determine the telephone number of the remote terminal by using one of the following approaches: (a) retrieving from the memory, which may contain a telephone number associated with the IP address of the remote terminal; (b) retrieving from the destination communication device's memory via the Internet communication pathway; (c) receiving from the user of the communication device using the keypad interface or speech and voice recognition; (d) receiving from the user of the destination communication device via the Internet communication pathway, using the keypad interface or speech and voice recognition; or (e) retrieving from a location tracking server, by using the IP address as a handle registered with the tracking server. Besides these logical approaches, the processing circuitry may employ other approaches to identify telephone number of the remote terminal, such as retrieving from the server to which the user is registered to avail Internet service. The server may also contain the telephone numbers associated with the registered dual voice communication devices 113, 117, 119 and 121.

The quality testing itself may comprise of test packets revelations of the quality of a communication pathway. The automatic handoff pre-programming may include factors such as quality testing, bandwidth limitations, migration out of range and link cost factors. Three-way call handoff is also contemplated, that is, the three-way call is jointly serviced by the Internet and the public switched telephone network communication pathway until handoff is complete.

The processing circuitry within the phones constructed in accordance with the present invention employs various techniques to determine the capabilities of other encountered phones and to adjust its interact based thereon. Such other encountered phones may also offer full functionality or may only operate entirely or in part in legacy modes. Such techniques may be applied as part of call setup or soon thereafter for each call, upon encountering a new recipient or calling voice communication device (in some of the text simply referred to as phones or telephones), when usage of functionality requiring such underlying knowledge is desired, or in response to inquiries initiated by the calling or recipient phone.

For example, the processing circuitry may need to determine whether a recipient phone supports both Internet and public switched telephone network telephony (e.g., the telephones 113, 117, 119 or 121), public switched telephone network telephony only (e.g., the telephone 115), or Internet telephone only (e.g., the telephone 133). The processing circuitry might also need to know: 1) whether the calling or recipient phone has external bridging support; 2) the telephone number, Internet handle, Internet service provider address, or Internet address; and 3) information necessary for interacting with the external bridging support and Internet service provider including any telephone numbers, handles, passwords, authorization codes, billing information. The processing circuitry may also deliver its own such information as a matter of course or upon request from the calling or recipient phone.

Internet capabilities may indicate whether a phone can utilize the Internet to support: a) voice calls, real-time or delayed audio/video/image playback exchanges with or without real-time audio and/or video capture; b) image and text exchanges; c) the exchange of system capabilities and limitations (e.g., screen size, speaker capability, processing power, battery limitations); d) the exchange of software or firmware information (e.g., codecs, version numbers, authors, etc.); e) the exchange of general system information (e.g., model numbers, manufacturer information, related links, etc.); f) instant messaging other higher level service exchanges; g) exchange of user information for each or current user of the phone (e.g., name, photos, videos, text, audio, birthday, credit card and bank account information, social security numbers, etc.) with public, professional, family and private information screening, i.e., some of which requires password or other user confirmation before sending; h) service provider information (e.g., bridging support addresses and telephone numbers, contact information, billing information, etc.); and i) current and potential Internet pathway capabilities and status.

The process of identifying a recipient phone's capabilities may involve as little as two steps or a longer sequence of steps depending on the calling and receiving phone configurations and service support. Specifically, if a calling phone has Internet capability it can register its telephone number and current Internet address with a tracking server. This can be done each time a call is attempted or, more likely, each time the phone establishes a new Internet address with periodic confirmation. A receiving phone with similar capability may do the same by registering its current telephone number and Internet address. For privacy concerns, either phone may choose not to so register even though it has Internet capabilities. Even if registered, because of the nature of roaming in and out of range and other wireless and wired, temporary or longer-term disconnects, the registration process does not guarantee that a registered Internet address can be used to reach a registered phone.

So, for example, when a calling phone desires to place a call to a receiving phone, the calling phone may contact the tracking server via Internet and, using the telephone number of the receiving phone, retrieve a corresponding Internet address if one has been registered. The calling phone attempts to verify the Internet address and exchange capability information by sending an inquiry packet to the retrieved Internet address. The calling phone may, immediately or after receiving caller confirmation, attempt the call on the public switched telephone network using the telephone number of the recipient device if: 1) no response packet is received; 2) the response packet indicates that the recipient phone is not the intended recipient (e.g., by the receiving device's failure to verify that the intended recipient's telephone number—sent with the inquiry packet—is owned by the receiving device); or 3) the tracking server returned no registered Internet address. Otherwise, the calling phone may, immediately or after receiving caller confirmation, attempt the call on the Internet network using the retrieved and verified Internet address.

If the tracking server fails to deliver a verifiable Internet address (either by delivering an incorrect address or by finding no registered address at all), the calling phone may either abort the Internet network call attempt (possibly settling for the public switched telephone network call) or resort to using the public switched telephone network to establish the Internet network call. In the latter case, once the tracking server fails to yield an Internet pathway to the receiving phone, the calling phone uses the public switched telephone network to reach the recipient telephone with yet unknown capabilities. To attempt to elicit the capabilities of the recipient telephone, the calling phone may either send, via the public switched telephone network, its Internet network address (or handle that may be used to look up the Internet network address via the tracking server), with or without additional capability information, or merely provide an indication of Internet support. Alternatively, the calling phone may instead wait for the recipient phone to attempt an inquiry either directly via the public switched telephone network or via the Internet network. In the latter case, the receiving phone accomplishes this through access to the tracking server using the calling phone's telephone number (extracted from the Caller ID sequence) to retrieve and use the calling phone's registered Internet address.

A calling phone may indicate its own capability and inquire as to the recipient phone capabilities as part of the public switched network's call setup signaling and procedures. For example, by placing the calling phone's Internet address (or handle) within a Caller ID sequence, the recipient phone will not only know that the calling phone has Internet telephony capability, but will also have the means to contact the calling phone, i.e., using such Internet address. Additional or alternative signaling approaches within the public switched telephone network calls are also possible. For example, the public switched telephone network could be adapted to directly support such signaling instead of usurping Caller ID fields. Signaling could also involve modulated or unmodulated signals, tones or "clicks" delivered after a connection is made to convey an indication of Internet capability, with or without the Internet address (or handle from which the Internet address can be retrieved) or other capability information.

After receiving the calling phone's Internet address, the receiving phone may immediately respond to the calling device via the Internet. Such response may merely convey recipient phone capabilities, may invoke an immediate handoff sequence, or may terminate the calling attempt with or without voice mail or textual, video, image or audio messaging. As a result of such interchange, the public switched telephone call may continue beginning with, for example, delivery of ring signals on both phones if not previously set in motion. Alternatively, the calling phone could be sent to voice mail, display some media message to the caller, terminate the interchange, switch to Internet telephony, etc.

A simple interchange between two phones that ignore tracking server support might comprise: 1) a calling phone dials the telephone number of a receiving phone; 2) as part of the call setup, the calling phone delivers its Internet address; 3) the receiving phone uses the delivered Internet address to route its full capabilities to the calling phone accompanied by a reciprocal request; 4) the calling phone responds by sending its full capabilities to the receiving phone; 5) none, one or both of the phones test/evaluate the Internet pathway; 6) sufficient performance above allows the dropping of the public switched telephone connection; 7) receiving phone call begins to ring; and 8) upon pickup, an Internet call begins.

An alternate typical exchange between two phones might involve: 1) a calling phone using the telephone number of the receiving phone to gain access to the registered Internet address of the receiving phone; 2) the calling phone attempts to establish an Internet pathway to the receiving phone using the retrieved Internet address and branch to the seventh step upon success; 3) in response to a failed second step, the calling phone attempts the call via the public switched telephone network; 4) the receiving phone retrieves the calling phone's Internet address using the Caller ID or other call setup signaling (using the calling phone's embedded: a) handle; b) IP address; or c) telephone number); 5) upon fourth step success, the receiving phone attempts to request that the calling phone establish an Internet pathway; 6) the calling phone responds and the calling and receiving phones exchange capabilities; 7) if the calling and receiving phones are capable and so authorize and the pathway is sufficient, the calling phone attempts to establish the Internet telephony call; 8) if the Internet telephony call can not be established or is not attempted in the seventh step, the calling phone places the public switched telephone network call to the receiving phone; and 9) if they pathway is available but not sufficient to support Internet telephony in whole or in part, the Internet pathway may be selectively used to supplement the public switched telephone network call.

More particularly, an interchange might involve continuing the public switched telephone network call if, for example: a) the Internet pathway performance proves insufficient; b) the Internet capabilities of at least one of the calling and receiving phones does not include telephony; or c) at least one of the calling and receiving phones have been configured with a preference for public switched network telephony, possibly requiring user confirmation before switching which has not been received. Even if the public switched telephone network is selected for the ongoing call, the Internet pathway may still be used to support other types of exchanges to supplement the public switched network telephony call. For example, although preferring public switched network telephony for voice, a caller may set the calling phone to automatically or manually initiate delivery of a textual, audio, image and/or video greeting (e.g., a business card) via the Internet network for use by the receiving phone as part of the "ring" announcement, greeting, playback or display, and phone book storage prior to, during or after a call.

When the calling phone sends an Internet address as part of the public switched telephone network's call setup signaling, the recipient phone that also has Internet telephony capability might perform any one or more of the following: 1) do nothing until a need for information arises; 2) send an capability response (that includes the recipient's Internet address) to the calling phone via the Internet network; 3) prompt its user to request or accept a switch to Internet telephony; 3) send the calling phone a request via the Internet network to switch to Internet telephony; 4) send the calling phone a signal (such as a series of short "clicks", tones, or a modulated signal as mentioned above) via the public switched telephone network wherein the signal may only communicate a command, request and basic capability information or may also contain more detailed capability information, e.g., within the modulation.

When a caller prefers to use the public switched telephone network but only has access to a receiving phone's handle (or Internet address), the process to establish the call also involves a multi-step approach. First, the calling phone uses the handle to hopefully retrieve the current registered Internet address of the receiving phone. Upon success or if the calling phone already has the address, the calling phone attempts to contact the receiving phone via the Internet. After verifying that the recipient is that intended, the calling phone requests the telephone number of the receiving phone. The receiving phone may reject the request (because the calling phone is unknown or otherwise), and may offer the calling phone an attempt to leave a message via the current Internet pathway. Otherwise, the receiving phone delivers its telephone number to the calling phone, which, in turn, responds by attempting to establish the call via the public switched telephone network. Once connected, the Internet pathway may be discontinued or used to provide supplemental information independent of or relating to the call.

Of course, instead of an end-to-end Internet telephony call with its inherent supplemental information pathway and instead of an end-to-end public switched telephone network call with or without an end-to-end Internet pathway supporting supplemental information exchanges, mixed pathways are also possible as will be pointed out in more detail with reference to FIG. 4. For example, the telephony call pathway from a calling phone might originate from via the public switched telephone network and bridge into the Internet network to the recipient phone. At the same time, a supplemental information pathway supporting such telephony call could exist with an end-to-end Internet pathway between the calling and receiving phones. A call originating via the Internet network and bridged into the public switched telephone network to the receiving phone might be used for the call with the supplemental pathway, if used, being end-to-end Internet.

Although the supplemental pathway as described above does not carry the call itself, this need not be the case. Instead, the call pathway and supplemental pathways may work together to support the call exchange. For example, the calling phone pathway to the receiving phone (half-duplex) may involve an end-to-end public switched telephony pathway. At the same time, the other "half" of the call from the receiving phone to the calling phone might pass through an end-to-end Internet telephony pathway. In addition, the end-to-end Internet pathway could be used for other supplemental information exchange beyond the call itself. Other alternative sharing of the call exchange duties could be split across the call pathway and supplemental pathway. For example, audio call information might flow through one path while video call information takes the other, or background music audio might take one pathway, while the other is used for the voice audio. Further, as discussed herein, switching the call pathway mid-call is also applicable when referring to the supplemental pathway. For example, if a call is established such that the call itself (i.e., the voice and possibly video captured as part of the caller to recipient interaction and exchange) is split across two (or more) pathways (either different half-duplex pathways, different call portion pathways, or a combination of both), only a part to all of the pathways, including the pathway(s) through which supplemental information flows) may be switched to an alternative or modified pathway.

Figure 2:
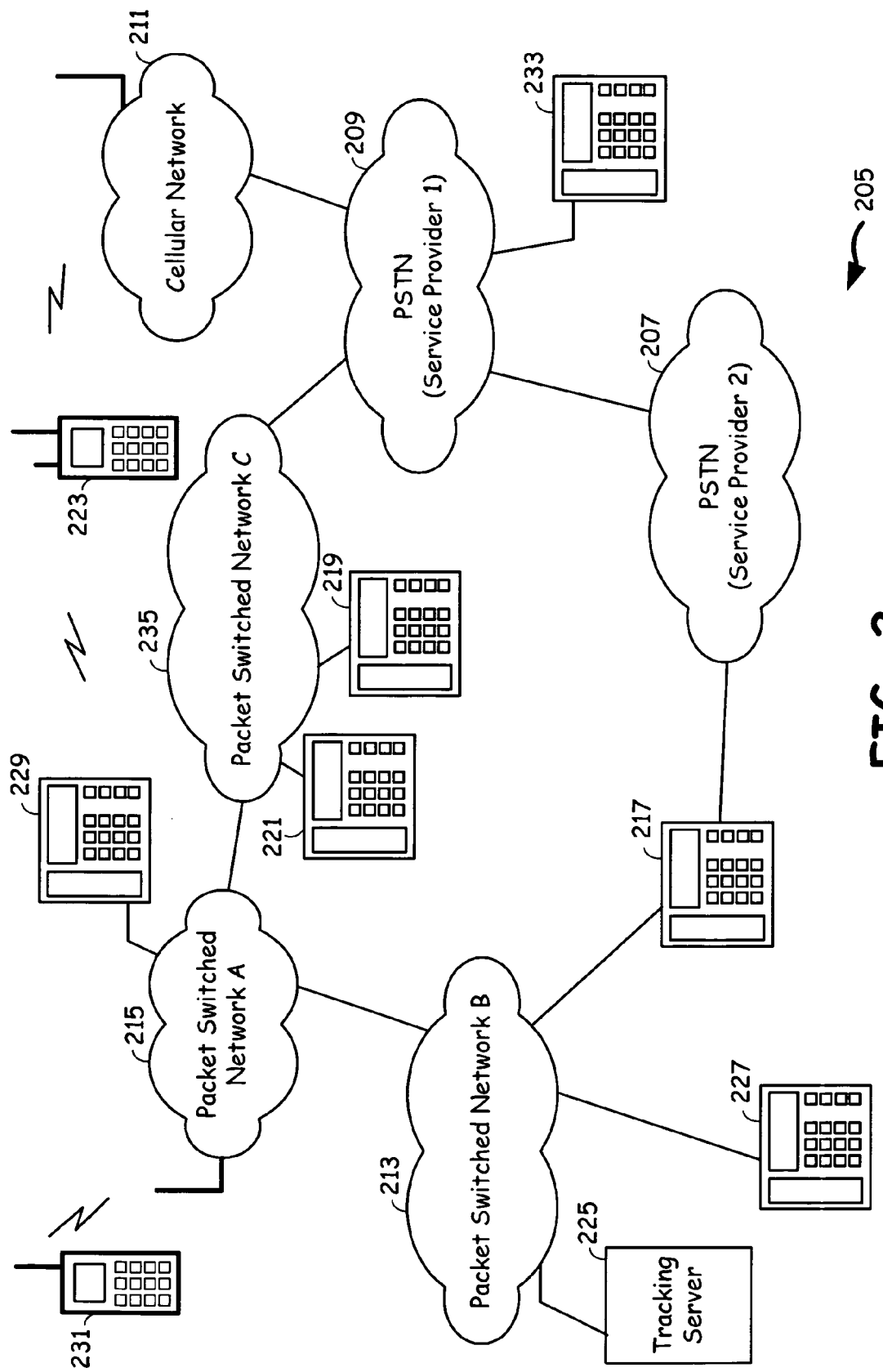
FIG. 2 is a block diagram illustrating an embodiment of voice communication devices that support both Internet and public switched telephone network telephony in which a packet switched network service provider performs the handoff between Internet and public switched telephone network communication pathways.

FIG. 2 is a block diagram 205 illustrating an embodiment of voice communication devices that support both Internet and public switched telephone network telephony, and in which a packet switched network service provider performs the handoff between Internet and public switched telephone network communication pathways. The illustrated infrastructure comprises another embodiment in which a packet switched network C 235 provides handoff support to dual voice communication devices 221 and 219. The packet switched and public switched telephone network service provider's networks shown also illustrate packet switched networks A, B 213 and 215, public switched telephone network service provider's networks 1, 2 207 and 209 and a cellular network 211. Internet communication devices 227 and 229, 231 are communicatively coupled to the packet switched networks B 213 and A 215 respectively. Similarly, a public switched telephone network voice communication device 233 is communicatively coupled to the public switched telephone network service provider's network 209. The packet switched network B 213 and the public switched telephone network service provider's network 2 207 provide service to a dual voice communication device 217 (described with reference to the FIG. 1). The packet switched network A 215 and the cellular network 211 provide service to a cell phone 223 that supports both Internet and public switched telephone network telephony. The tracking server 225 allows location tracking of the Internet communication devices.

The dual voice communication device 217 or 223 is communicatively coupled to the packet switched networks A or B 215 or 213 via a wired Local Area Network (LAN) or Wireless Local Area Network (WLAN). The dual voice communication device 217 is also simultaneously communicatively coupled to the public switched telephone network service provider's network 2 207 via a line cord or wirelessly. The cellular phone 223 is also communicatively coupled to the cellular network 211 wirelessly.

Dual voice communication devices 221 and 219 are communicatively coupled to the packet switched network C 235 alone. The dual voice communication device 221 or 219 allow user to switch from public switched telephone network to Internet communication pathway or vice versa. Here, the packet switched network C 235 provides the handoff support to the dual voice communication device 221 or 219. The processing circuitry incorporated into the dual voice communication devices 221 and 219 transmit appropriate control signals to the packet switched network C 235, based upon the user input, for the handoff to take place.

Figure 3:
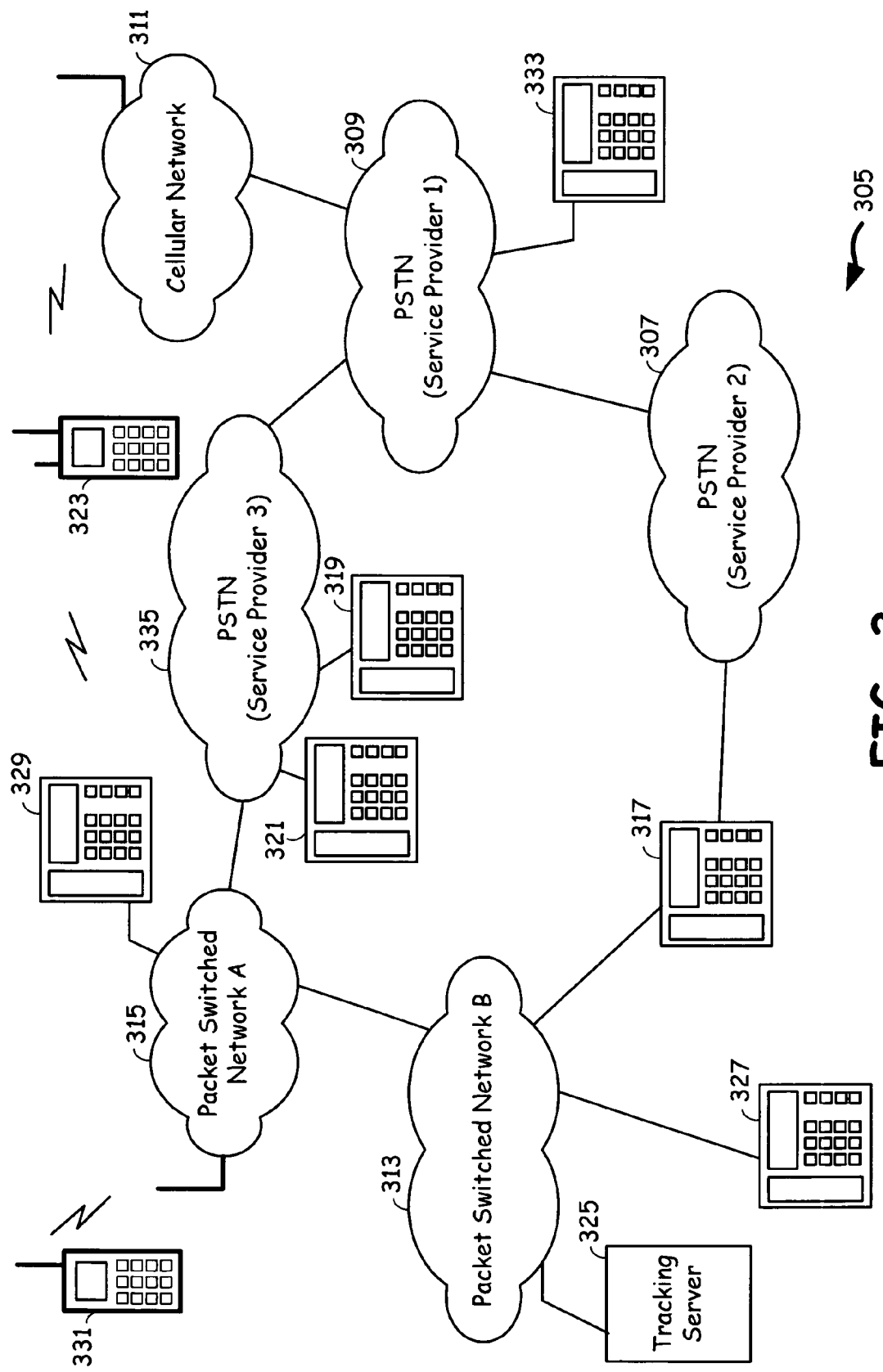
FIG. 3 is a block diagram illustrating an embodiment of voice communication devices that support both Internet and public switched telephone network telephony in which a public switched telephone network service provider performs the handoff between Internet and public switched telephone network communication pathways.

FIG. 3 is a block diagram 305 illustrating an embodiment of voice communication devices that support both Internet and public switched telephone network telephony in which a public switched telephone network service provider performs the handoff between Internet and public switched telephone network communication pathways, in accordance with the present invention. The infrastructure shown is one more embodiment in which a public switched telephone network service provider 3 335 provides handoff support to dual voice communication devices 321 and 319. The packet switched and public switched telephone network service provider's networks shown also illustrate packet switched networks A, B 313 and 315, public switched telephone network service provider's networks 1, 2 307 and 309 and a cellular network 311. Internet Phones 329, 331 and 327 are communicatively coupled to the packet switched networks A 315 and B 313 respectively. Similarly, a phone 333 is communicatively coupled to the public switched telephone network service provider's network 309. The packet switched network B 313 and the public switched telephone network service provider's network 2 307 provide service to a dual voice communication device 317 (described with reference to the FIG. 1). The packet switched network A 315 and the cellular network 311 provide service to a cell phone 323 that supports both Internet and public switched telephone network telephony. The tracking server 325 allows location tracking of the Internet communication devices.

The dual voice communication device 317 or 323 is communicatively coupled to the packet switched networks A 315 or B 313 via a wired Local Area Network (LAN) or Wireless Local Area Network (WLAN). The dual voice communication device 317 is also simultaneously communicatively coupled to the public switched telephone network service provider's network 2 307 via a line cord or wirelessly. The cellular phone 323 is also communicatively coupled to the cellular network 311 wirelessly.

Dual voice communication devices 321 and 319, in this embodiment, are communicatively coupled to the public switched telephone network service provider's network 3 335 alone. The dual voice communication device 321 or 319 allow user to switch from public switched telephone network to Internet communication pathway or vice versa. Here, the public switched telephone network service provider's network 3 335 provides the handoff support to the dual voice communication device 321 or 319. The processing circuitry incorporated into the dual voice communication devices 321 and 319 transmit appropriate control signals to the public switched telephone network service provider's network 3 335, based upon the user input, for the handoff to take place.

FIG. 4 is a block diagram 405 illustrating an embodiment of voice communication devices that support both Internet and public switched telephone network telephony in which bridging systems allow public switched telephone network-to-Internet and Internet telephone-to-public switched telephone network voice communications. The infrastructure shown is another embodiment in which a packet switched network A 413 and a public switched telephone network service provider's network 2 407 are bridged via a bridging system A 421. Similarly, the packet switched network A 413 and a cellular network 411 are bridged via a bridging system B 423. These bridging systems A and B 421 and 423 allow mixed pathway communications between dual voice communication devices 419 and 427. Also, the bridging systems A and B 421 and 423 allow communications between the dual voice communication device 419 or 427 and an Internet alone voice communication device 417 or a public switched telephone network alone voice communication device 425. The tracking server 415 allows location tracking of the Internet communication devices. The infrastructure also shows a dual voice communication device 429 in which the public switched telephone network service provider 2 407 provides handoff support via bridging to Internet pathways.

One of the mixed communication pathway communications may occur, for example, in conjunction with the communication between the users of dual voice communication devices 419 and 427. In this situation, the user of the dual voice communication device 419 may dial the telephone number of the dual voice communication device 427, while being in Internet mode. The packet switched network A 413 utilizes the bridging system B 423 to communicatively couple with the cellular network 411 thus establishes communication with the remote terminal 427. Similarly, other combinations of mixed communication pathways are also occur.

In addition to the four operations mentioned with reference to the FIG. 1 and the mixed pathway operation described above, the processing circuitry operations also include single voice communication device handoff from Internet to public switched telephone network, or public switched telephone network to Internet, with or without the remote terminal's knowledge. In these operations of mixed pathways (public switched telephone network and Internet communication pathways), besides bridging via bridging systems A and B 421 and 423, the bridging may also occur within the home in a STB, dual voice communication device, computer or any other home based bridging equipment. For example, bridging may be provided by cable, fiber or public switched telephone network service provider or by an independent network based provider.

A transition from Internet to Internet communication pathway to a public switched telephone network to Internet communication pathway may take place because of disturbances at the caller's phone Internet reception, for example. Similarly, the call that was originally set up as a public switched telephone network to Internet call with bridging support may be switched by either party (the users of either of the dual voice communication device 419 or 427) or either of the dual voice communication devices 419 or 427 itself, bridging support is not needed.

The processing circuitry within the dual voice communication devices 419, 425 or 427 constructed in accordance with the present invention employs various techniques to determine the bridging capabilities of other encountered voice communication devices (in some of the text simply referred to as phones or telephones) and/or communication pathway and to adjust its interact based thereon. For example, the processing circuitry may need to determine whether a recipient phone: 1) supports both Internet and public switched telephone network telephony (e.g., the telephones 419 or 427), 2) supports public switched telephone network telephony only (e.g., the telephone 425), 3) supports Internet telephone only (e.g., the telephone 417). In addition, when bridging systems A or B 421 or 423 are involved, the processing circuitry might also need to know: 1) whether the calling or recipient phone has external bridging support; 2) the telephone number, Internet handle, Internet service provider address, or Internet address; and 3) information necessary for interacting with the external bridging support and Internet service provider including any telephone numbers, handles, passwords, authorization codes, billing information. The processing circuitry may also deliver its own such information as a matter of course or upon request from the calling or recipient phone. Internet capabilities may indicate whether a phone can utilize the Internet to support service provider information (e.g., bridging support addresses and telephone numbers, contact information, billing information, etc.) and current and potential Internet pathway capabilities and status.

For example of a mixed pathway communication, the telephony call pathway from a calling phone might originate via the public switched telephone network and bridge into the Internet network to the recipient phone. At the same time, a supplemental information pathway supporting such telephony call could exist with an end-to-end Internet pathway between the calling and receiving phones. Alternatively, a call originating via the Internet network and bridged into the public switched telephone network to the receiving phone might be used for the call with the supplemental pathway, if used, being end-to-end Internet. Although the supplemental pathway as described above does not carry the call itself, this need not be the case as described with reference to FIG. 1. In a mixed communication pathway supported by bridging systems A or B 421 or 423, for example, each of the calling and receiving phones can be supported by multiple service providers.

For example, a calling phone may be serviced by zero or more of each of the following: 1) public switched telephone network to internet bridging service provider (having a single or distributed bridging infrastructure); 2) internet to public switched telephone network bridging service provider (having a single or distributed bridging infrastructure); 3) public switched telephone network access service provider providing pots (plain old telephone service) or cellular service; 4)

internet access service provider; 5) tracking service provider that delivers a telephone number based on a handle or internet address, or visa versa. Similarly, a receiving phone may also be serviced by zero or more of each of the above mentioned service providers.

For example, the calling phone may be a dual voice communication device that supports both Internet and public switched telephone network telephony, such as the phone 419, and the recipient phone may be a cellular phone that supports both Internet and public switched telephone network telephony, such as the phone 427. In this scenario, both calling and recipient phones may employ a public switched telephone network to public switched telephone network or an Internet to Internet communication pathways. If one of the users chooses to handoff to an alternative communication pathway, the supporting service provider may use bridging to establish a mixed communication pathway. Similarly, if the recipient phone is a public switched telephone network only phone, such as the phone 425, an Internet call originated from a dual communication device such as the phone 421 results in a mixed communication pathway and may need bridging.

In utilizing bridging, such as bridging systems A or B 421 or 423, the service providers may through cooperation provide single service to the dual voice communication devices such as 429. The different procedures involved with bridging, such as formatting, registration and authorization, for establishing and maintaining a pathway through a bridge may vary from service provider to service provider. Further, these procedures may also vary depending on whether the destination phone of a particular bridge is a dual voice communication device, e.g. 419 or 427, or merely a party in communication with a dual voice communication device, e.g. 419 or 427. For example, the bridging scenarios may include single bridging scenarios (public switched telephone network to Internet as well as Internet to public switched telephone network) and double bridging scenarios (public switched telephone network to Internet to public switched telephone network as well as Internet to public switched telephone network to Internet).

In a mixed communication pathway, as described above, the calling phone need to know the capabilities of the receiving phone and the communication pathway bridging capabilities. For example, in one single public switched telephone network to Internet bridging scenario, the processing circuitry (or simply the calling phone) sets up a call by dialing the telephone number of a receiving phone, while in Internet mode. Further, through the processes of interaction with the receiving phone, as described with reference to the FIG. 1, the calling phone determines the capabilities of the receiving phone. The calling phone, by interaction with the switched packet network and/or public switched telephone network service provider's network determines the bridging capabilities of the service provider. In a single public switched telephone network to Internet bridging scenario, the calling phone, as a part of service of the public switched telephone network service provider may know beforehand bridging capabilities. Once the call set up and determination of the capabilities of the receiving phone is done, the calling phone determines a communication pathway, based upon factors such as quality of communication and costs of the communication pathways. The Internet service provider, using bridging systems, bridges the call from the packet switched network to public switched telephone network as appropriate and the public switched telephone network service provider of the receiving phone directs the call to the receiving phone. In this scenario, the receiving phone may be a dual voice communication device, such as 419, 425, or 427, or may be a public switched telephone network only phone, such as 425.

Similarly, in another single Internet to public switched telephone network bridging scenario, the calling phone sets up a call by providing the IP address of the receiving phone while in public switched telephone network mode. The information exchange between the calling and receiving phones, to determine the capabilities of the receiving phone, are described with reference to the FIG. 1. Once the call set up and determination of the capabilities of the receiving phone is completed, the calling phone sends the IP address of the receiving phone to the public switched telephone network service provider. The public switched telephone network service provider, using bridging systems, bridges the call from the public switched telephone network to packet switched network as appropriate and the Internet service provider of the receiving phone directs the call to the receiving phone. In this scenario, the receiving phone may be a dual voice communication device, such as 419, 425, or 427, or may be an Internet only phone, such as 417.

A double public switched telephone network to Internet to public switched telephone network bridging scenario also begins with the calling phone estimating the receiving phone capabilities and the service provider's bridging capabilities. The calling phone begins this by dialing the telephone number of a receiving phone, while in public switched telephone network mode. As part of the call setup, the calling phone delivers its telephone number and the receiving telephone number to the public switched telephone network service provider. The public switched telephone network service provider, using bridging systems, bridges the call from the public switched telephone network to a packet switched network as appropriate (this may occur because of difficulties with the public switched telephone network communication pathways). The Internet service provider, again using bridging systems, connects the call to the receiving phone's service provider's public switched telephone network. Finally, the public switched telephone network service provider of the receiving phone directs the call to the receiving phone.

Similarly, the calling phone initiates a double Internet to public switched telephone network to Internet bridging scenario by initial information exchange to determine the capabilities of the receiving phone and service provider's bridging capabilities. The calling phone uses the IP address of a receiving phone to connect to a dual voice communication device or an Internet only voice communication device, while in Internet mode. As part of the call setup, the calling phone delivers its IP address and the receiving IP address to the Internet service provider. The Internet service provider, using bridging systems, connects the call from the packet switched network to a public switched telephone network as appropriate (this may occur because of difficulties with the Internet communication pathways). The public switched telephone network service provider, again using bridging systems, bridges the call to a recipient phone's service provider's packet switched network. Finally, the Internet service provider of the receiving phone directs the call to the receiving phone. The double bridging scenarios occur by way of cooperation between different service providers.

Further, the communication may also occur in a half-duplex approach, where for example, forward communication (caller to the recipient) may occur via public switched telephone network communication pathway while the return communication (recipient to the caller) may occur via Internet pathway. Alternatively, each pathway (forward and return communication pathways) may also include bridging, in a mixed communication pathway illustrated in the Figure.

For example, a half-duplex communication may begin with the calling phone determining the capabilities of the receiving phone and the communication pathway capabilities. The calling phone dials the telephone number of a receiving phone, while in Internet mode. The Internet service provider, using bridging systems, bridges the call from the packet switched network to public switched telephone network as appropriate. The public switched telephone network service provider of the receiving phone directs the call to the receiving phone. The receiving phone, in conjunction with the service provider, may choose a different return path. The public switched telephone network service provider of the receiving phone, using bridging systems, bridges the call from the public switched telephone network to a packet switched network for the return communication (receiver to caller). Finally, the Internet service provider of the calling phone directs the return communication to the calling phone.

The half-duplex communication as described above carry the forward and return communication in two different bridged communication pathways. Alternatively, the half-duplex communication may also take place using a plurality of communication pathways, carrying voice, video, data related to the call, background music and supplemental information in a plurality of Internet, public switched telephone network or a bridged communication pathways. For example, the forward communication pathway to the receiving phone (half-duplex) may involve an end-to-end public switched telephony pathway. At the same time, the return communication may involve an end-to-end Internet telephony pathway. The data communication related to the call and supplemental information exchange may take place using entirely different communication pathways. Finally, the communication pathways may be determined by a combination of factors involving calling, receiving communication devices, users of these communication devices, the respective service providers and third party service providers, cost and quality of the communication pathways.

Figure 5:
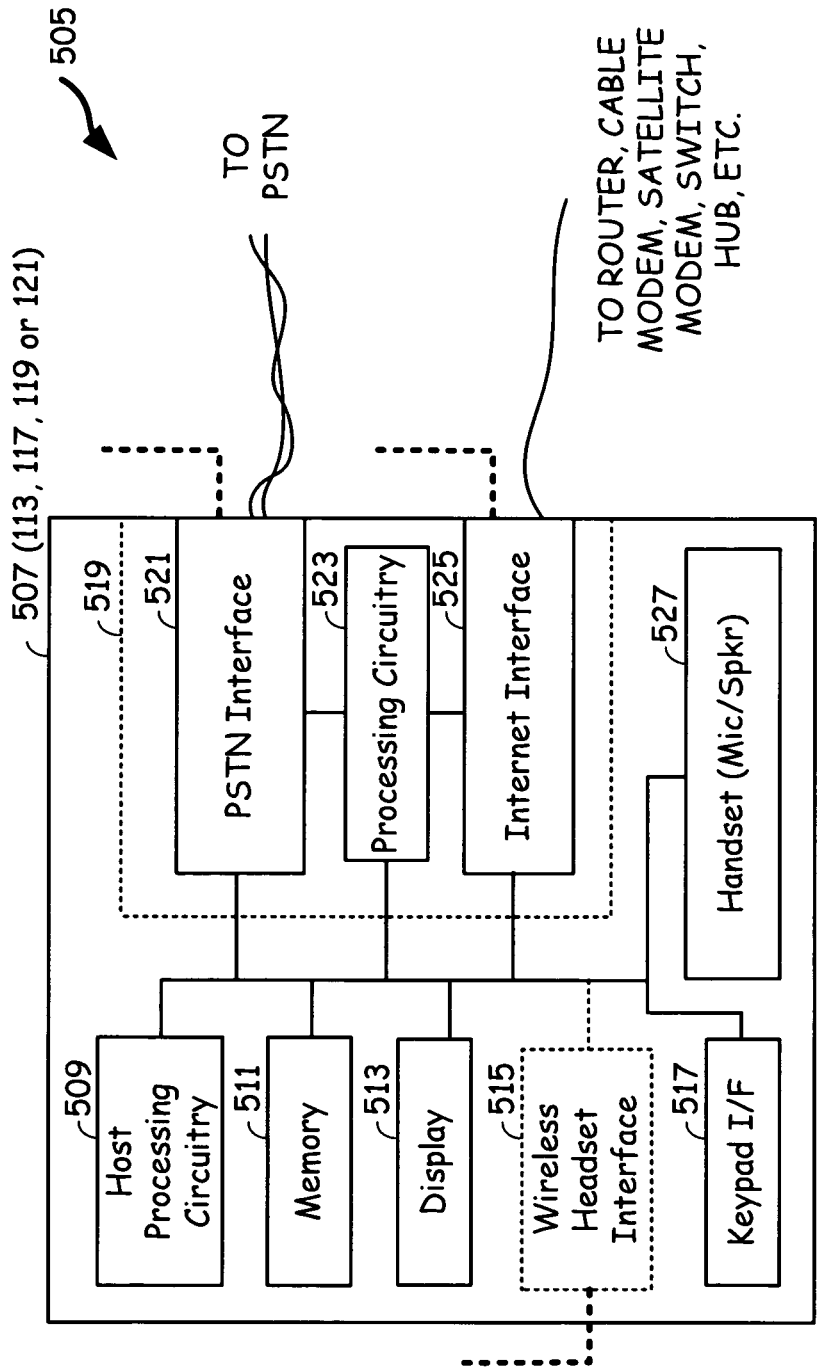
FIG. 5 is a block diagram illustrating a voice communication device constructed in accordance with the embodiments of FIGS. 1, 2, 3 and/or 4 of the present invention.

FIG. 5 is a block diagram 505 illustrating a voice communication device constructed in accordance with the embodiments of FIGS. 1, 2, 3 and/or 4 of the present invention. The voice communication device illustrated supports both Internet and public switched telephone network telephony, and may correspond to any of the telephones 113, 117, 119, 121, 217, 221, 219, 223, 317, 321, 319, 323, 419 or 427 (FIGS. 1, 2, 3 and 4). In other embodiments, the dual voice communication device of the present invention may include fewer or more components than are illustrated as well as lesser or further functionality. In other words, the illustrated dual voice communication device is meant to merely offer one example of possible functionality and construction in accordance with the present invention.

The dual voice communication device generally includes host processing circuitry 509, memory 511, display 513, optional wireless headset interface 515, keypad interface 517, handset 527, and communication interface 519. These components communicatively coupled to one another via one or more of a system bus, dedicated communication pathways, or other direct or indirect communication pathways. Host processing circuitry 509 may be, in various embodiments, a microprocessor, a digital signal processor, a state machine, an application specific integrated circuit, a field programming gate array, or other processing circuitry. Memory 511 may be random access memory, read-only memory, flash memory, a disk drive, an optical drive, or another type of memory that is operable to store computer instructions and data. Display 513 may be a conventional LCD display, an LED display, a touch based display, or another display. Wireless headset interface 515 may be a WPAN interface such as a Bluetooth interface, a proprietary wireless headset interface, or another wireless interface. Handset 527 enables a user to interact with the components of the bridging telephone and includes a speaker and a microphone. Keypad interface 517 enables the user to communicate with the bridging telephone via keystroke inputs. The handset 527 may be movable with respect to the rest of the components of the dual voice communication device. In other embodiments, the handset may be replaced by a microphone and a speaker. Such is the case when the telephone 121, 223, 323 or 427 is a wireless terminal such as that illustrated in FIGS. 1, 2, 3 and 4, respectively.

Communication interface 519 includes a public switched telephone network interface 521, processing circuitry 523, and packet switched network interface 525. The public switched telephone network interface 521 communicatively wired or wirelessly couples to the public switched telephone network 107, 109, 111, 207, 209, 211, 307, 309, 311, 407, 409 or 411 as was previously described with reference to FIGS. 1, 2, 3 and 4. The packet switched network interface 525 wired or wirelessly couples to the packet switched network 125, 127, 213, 215, 313, 315 or 413 as was previously described with reference to FIGS. 1, 2, 3 and 4. Generally, the components of the dual voice communication device work to handoff calls between the public switched telephone network 107, 109, or 111 and the packet data network 125 or 127. The processing circuitry, either the host processing circuitry 509 or the processing circuitry 523, controls the operation of the handoff to perform these bridging operations. In performing operations according to the present invention, the processing circuitry 509 and/or 523 of the dual voice communication device 507 determines that when a call is handed off to the public switched telephone network-public switched telephone network, Internet-Internet or mixed communication pathways. The processing circuitry 509 and/or 523 then obtains telephony handoff control signals for the call through the user interaction with the keypad interface or automatically based upon considerations of the quality of communication pathway and/or cost. Based upon these telephony handoff control signals or pre-programmed automatic handoff instructions, the processing circuitry 509 and/or 523 enables the public switched telephone network interface 521 and the packet switched network interface 525 to handoff the call between the public switched telephone network interface 521 and the packet switched network interface 525.

Figure 6:
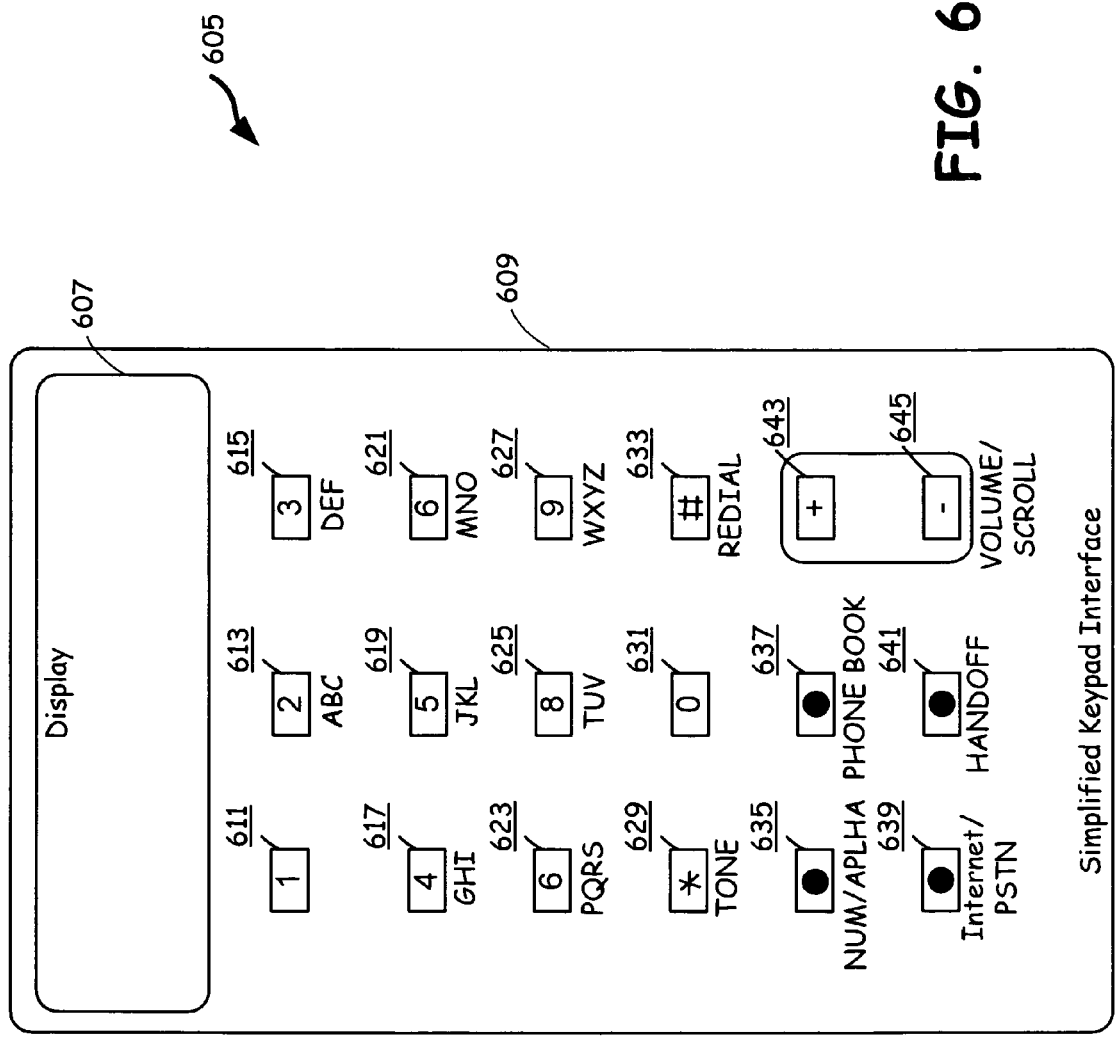
FIG. 6 is a perspective diagram illustrating a simplified keypad interface and a display in a voice communication device that supports both Internet and public switched telephone network telephony, in accordance with the present invention.

FIG. 6 is a perspective 605 diagram illustrating a simplified keypad interface 609 and a display in a voice communication device that supports both Internet and public switched telephone network telephony, in accordance with the present invention. Keys 611, 613, 615, 617, 619, 621, 623, 625, 627, and 631 provide numerals as well as alphabets to enter telephone numbers or IP addresses, in conjunction with a NUM/ALPHA key 635. Once the key 635 is pressed, alpha or num appears on the display, and when in alpha mode, the repeated pressing of the key 613, 615, 617, 619, 621, 623, 625 or 627 makes corresponding alphabet to be displayed. A TONE key 629 provides toggling between pulse mode and tone mode when working with the public switched telephone network calls. A REDIAL key 633 provides redial function when working with the public switched telephone network or Internet calls. A PHONE BOOK key 637, when pressed, displays the contents of the memory, that is, the names, IP addresses and the telephone numbers of the individuals as programmed by the user. To program a user name with corresponding IP address and telephone number, the user may press PHONE BOOK key 637 for more than 5 seconds and then enter corresponding information. VOLUME/SCROLL keys 643 and 645 allow user to change the volume of the speaker of the handset. In addition, when VOLUME/SCROLL keys 643 and 645 used after pressing the PHONE BOOK key 637, allows user to scroll through the contents of the memory. An expanded keypad interface (not shown), in another embodiment, may contain individual keys for each numerals and alphabets.

A display 607 facilitates user in the process of making the phone call and displays following information among others, when a public switched telephone network to Internet handoff takes place: (a) display a destination telephone number and retrieved IP address; (b) display a communication pathway of either Internet or public switched telephone network being used; (c) indicate quantitatively the quality of the communication pathway being used; and (d) indicate when quality of the communication pathway being used is below quality threshold. Similarly, when an Internet to public switched telephone network handoff takes place, the following information are displayed: (a) a destination IP address and retrieved telephone number; (b) a communication pathway of either Internet or public switched telephone network being used; (c) indicate quantitatively the quality of the communication pathway when used; and (d) indicate when quality of the communication pathway being used is below quality threshold.

Internet/PSTN key 639 allows user to make Internet to Internet calls and public switched telephone network to public switched telephone network calls. The function of Internet/PSTN key 639 is in conjunction with the phonebook, it allows user to select between an IP address and a telephone number when the user scrolls through the phonebook. Once the user selects a name in the phonebook, by pressing the Internet/PSTN key 639, user is able to select either an IP address or a telephone number. The processing circuitry then uses the selected IP address or telephone number to connect to a remote terminal via either Internet or public switched telephone network communication pathway, when the handset is lifted.

HANDOFF key 641 allows user to handoff between Internet and public switched telephone network communication pathways, either immediately or during a mid-call. Further, it allows Internet to public switched telephone network and public switched telephone network to Internet calls to occur when the supporting networks provide bridging. For example, user may select a telephone number of a remote terminal (or input manually the telephone number) and this telephone number is displayed on the display 607. Then, the user may lift the handset and press HANDOFF key 641. This allows the processing circuitry to set up a call using a public switched telephone network communication pathway and immediately handoff from public switched telephone network communication pathway to an Internet communication pathway (as described with reference to the FIG. 1). Similarly, if the HANDOFF key 641 is pressed during a mid-call, the mid-call handoff takes place during a dead zone.

In addition, pressing the HANDOFF key 641 for more than 5 seconds allows user to program the user preferences on an automatic handoff. In specific, when the HANDOFF key 641 is pressed for more than 5 seconds, the display 607 displays many options, in conjunction with the VOLUME/SCROLL keys 643 and 645. They are: (a) display 'enable automatic handoff' option, enabling which allows the dual voice communication device (113, 117, 119, 121, 217, 221, 219, 223, 317, 321, 319, 323, 419 or 427, in FIGS. 1, 2, 3 and 4) to take automatic handoff decisions based upon user set criteria; (b) display 'default mode Internet or public switched telephone network' option, that allows the user to prefer a default communication pathway between Internet and public switched telephone network; (c) display 'quality threshold setting' that allows the user to set a number between 0 to 9, 0 being the lowest quality threshold and 9 being the highest quality threshold; (d) display 'link cost considerations' that allows the user to set a cost preference by entering a number between 0 to 9, 0 being the lowest cost consideration and 9 being the highest cost consideration; and (e) display 'prompt before automatic handoff' option. However, once automatic handoff is enabled, the HANDOFF key 641 is disabled during the call and user may not be able to manually switch from Internet communication pathway to public switched telephone network communication pathway or vice versa.

Figure 7:
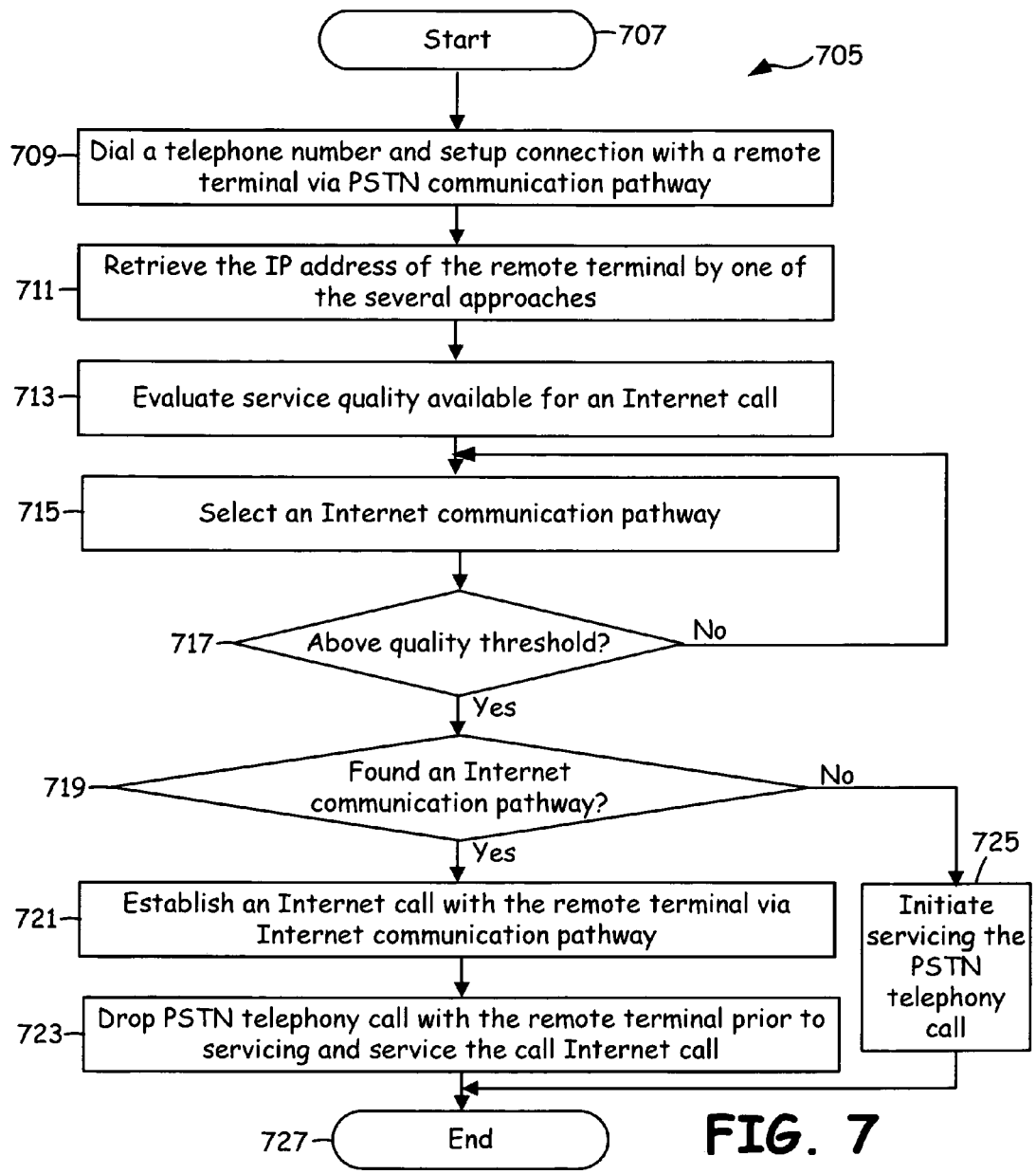
FIG. 7 is a flow diagram illustrating the method performed by a voice communication device that supports both Internet and public switched telephone network telephony during an operation of immediate handoff from public switched telephone network communication pathway to an Internet communication pathway.

FIG. 7 is a flow diagram 705 illustrating the method performed by a voice communication device that supports both Internet and public switched telephone network telephony during an operation of immediate handoff from public switched telephone network communication pathway to an Internet communication pathway, in accordance with the present invention. The method of immediate handoff starts at a block 707 when the user keys in telephone number of a remote terminal using the dual voice communication device, lifts the handset and presses HANDOFF key (described with reference to the FIGS. 1 and 6).

At a next block 709, the dual voice communication device that supports both Internet and public switched telephone network (PSTN) telephony dials the telephone number of a remote terminal and sets up connection with the remote terminal via a public switched telephone network communication pathway. Then, at a block 711, the dual voice communication device retrieves the IP address of the remote terminal by one of the several approaches described with reference to the FIG. 1. At a next block 713, the dual voice communication device evaluates the quality of one of several Internet communication pathways and at a block 715 selects an Internet communication pathway.

At a next decision block 717, the dual voice communication device determines if the selected Internet communication pathway quality is above the quality threshold. The manufacturer of the dual voice communication device or the user may program the quality threshold. Then, at a decision block 719, the dual voice communication device determines if an Internet communication pathway that is above the quality threshold is found. If not found, at a next block 725, the dual voice communication device services the call using the public switched telephone network communication pathway. Then, the method ends at an end block 727.

If at the decision block 719 an Internet communication pathway that is above quality threshold is found, then at a next block 721, the dual voice communication device establishes an Internet call with the remote terminal using the selected Internet communication pathway. Then at a next block 723, the dual voice communication device services the call via Internet communication pathway and drops the public switched telephone network call. The method ends at a next block 727.

Figure 8:
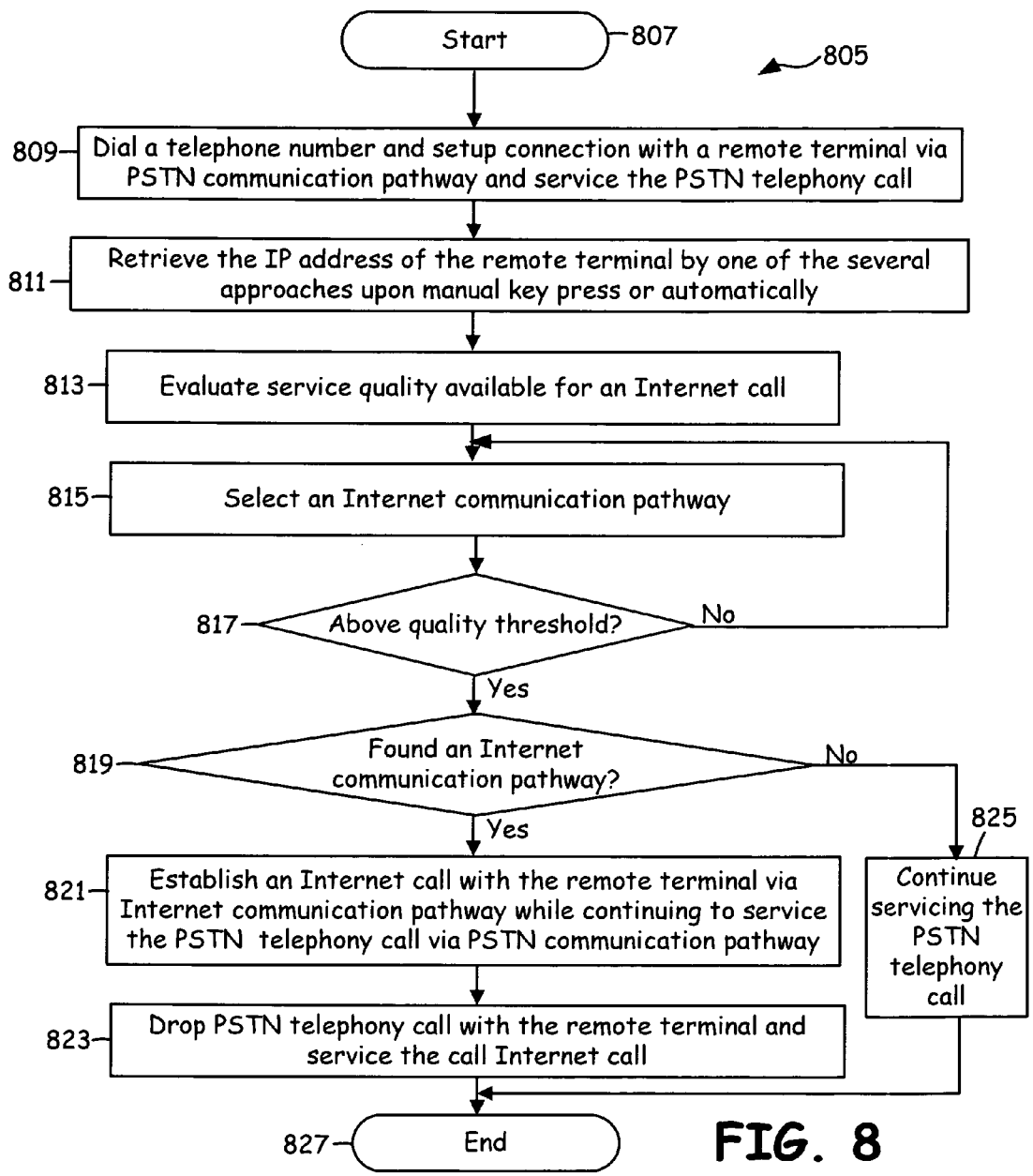
FIG. 8 is a flow diagram illustrating the method performed by a voice communication device that supports both Internet and public switched telephone network telephony during an operation of mid-call handoff from public switched telephone network communication pathway to an Internet communication pathway.

FIG. 8 is a flow diagram 805 illustrating the method performed by a voice communication device that supports both Internet and public switched telephone network telephony during an operation of mid-call handoff from public switched telephone network communication pathway to an Internet communication pathway, in accordance with the present invention. The method of mid-call handoff starts at a block 807 when the user keys in telephone number of a remote terminal using the dual voice communication device, lifts the handset.

Then, at a next block 809, the dual voice communication device dials the telephone number of a remote terminal and sets up connection with the remote terminal via a public switched telephone network communication pathway. Then, at the block 809, the dual voice communication device services the call via public switched telephone network communication pathway until the user presses a HANDOFF button (described with reference to FIGS. 1 and 6) during the call. At a next block 811, the dual voice communication device retrieves the IP address of the remote terminal by one of the several approaches described with reference to the FIG. 1. At a next block 813, the dual voice communication device evaluates the quality of one of several Internet communication pathways and at a block 815 selects an Internet communication pathway.

At a next decision block 817, the dual voice communication device determines if the selected Internet communication pathway quality is above the quality threshold. Then, at a decision block 819, the dual voice communication device determines if an Internet communication pathway that is above the quality threshold is found. If not found, at a next block 825, the dual voice communication device continues to service the call using the public switched telephone network communication pathway. Then, the method ends at an end block 827.

If at the decision block 819, an Internet communication pathway that is above quality threshold is found, then at a next block 821, the dual voice communication device establishes an Internet call with the remote terminal. The dual voice communication device establishes this call using the selected Internet communication pathway while continuing to service the public switched telephone network call. The handoff during mid-call takes place in a dead zone, without distracting the communication. Then at a next block 823, the dual voice communication device services the call via Internet communication pathway and drops the public switched telephone network call. The method ends at a next block 827.

Figure 9:
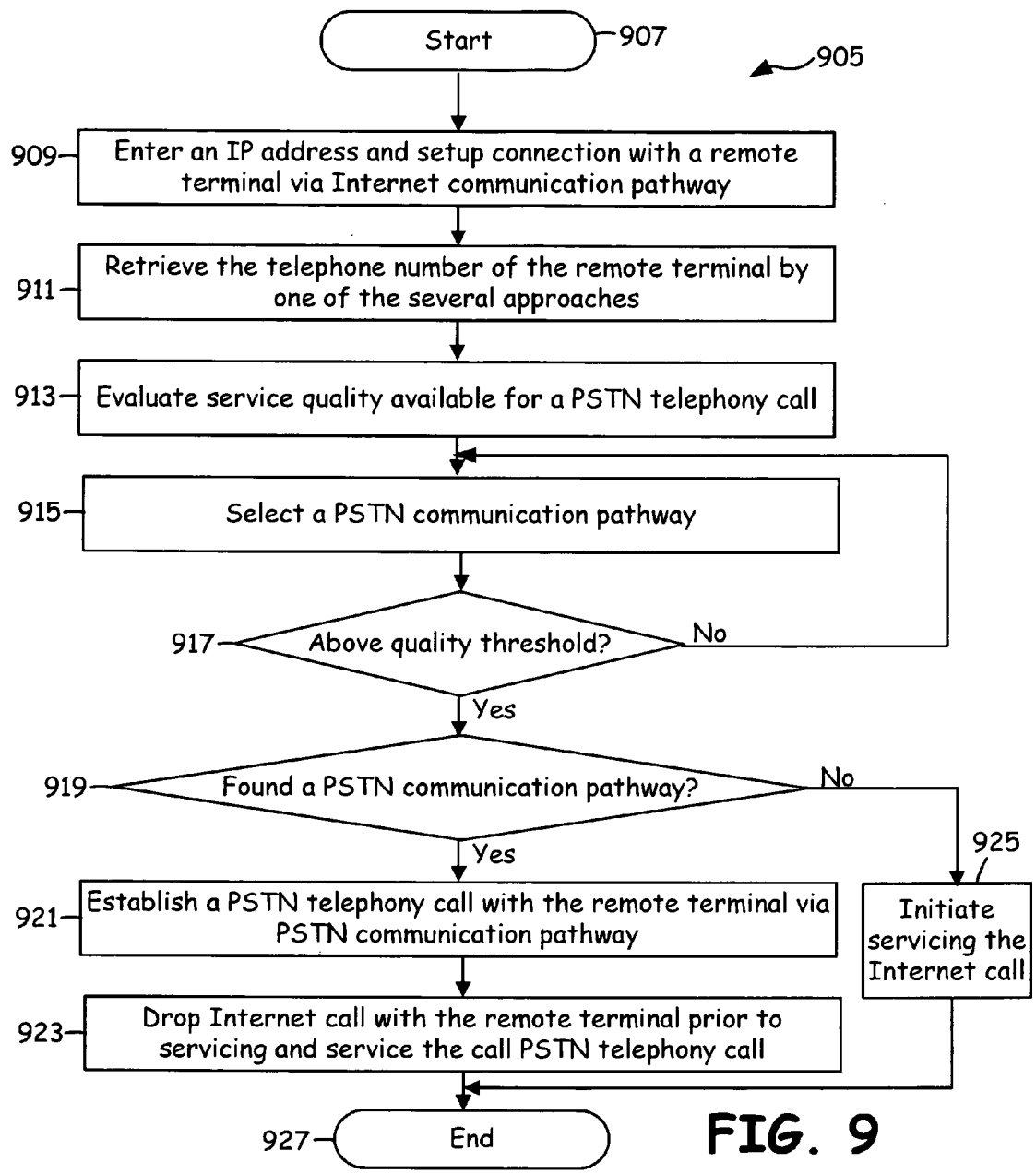
FIG. 9 is a flow diagram illustrating the method performed by a voice communication device that supports both Internet and public switched telephone network telephony during an operation of immediate handoff from Internet communication pathway to a public switched telephone network communication pathway.

FIG. 9 is a flow diagram 905 illustrating the method performed by a voice communication device that supports both Internet and public switched telephone network telephony during an operation of immediate handoff from Internet communication pathway to a public switched telephone network communication pathway. The method of immediate handoff starts at a block 907 when the user keys in IP address of a remote terminal using the dual voice communication device, lifts the handset and presses HANDOFF key (described with reference to the FIGS. 1 and 6).

At a next block 909, the dual voice communication device sets up a connection with the remote terminal via an Internet communication pathway. Then, at a block 911, the dual voice communication device retrieves the telephone number of the remote terminal by one of the several approaches described with reference to the FIG. 1. At a next block 913, the dual voice communication device evaluates the quality of one of several public switched telephone network communication pathways and at a block 915 selects a public switched telephone network communication pathway.

At a next decision block 917, the dual voice communication device determines if the selected public switched telephone network communication pathway quality is above the quality threshold. Then, at a decision block 919, the dual voice communication device determines if a public switched telephone network communication pathway that is above the quality threshold is found. If not found, at a next block 925, the dual voice communication device services the call using the Internet communication pathway. Then, the method ends at an end block 927.

If at the decision block 919 a public switched telephone network communication pathway that is above quality threshold is found, then at a next block 921, the dual voice communication device establishes a public switched telephone network call with the remote terminal using the selected public switched telephone network communication pathway. Then at a next block 923, the dual voice communication device services the call via public switched telephone network communication pathway and drops the Internet call. The method ends at a next block 927.

Figure 10:
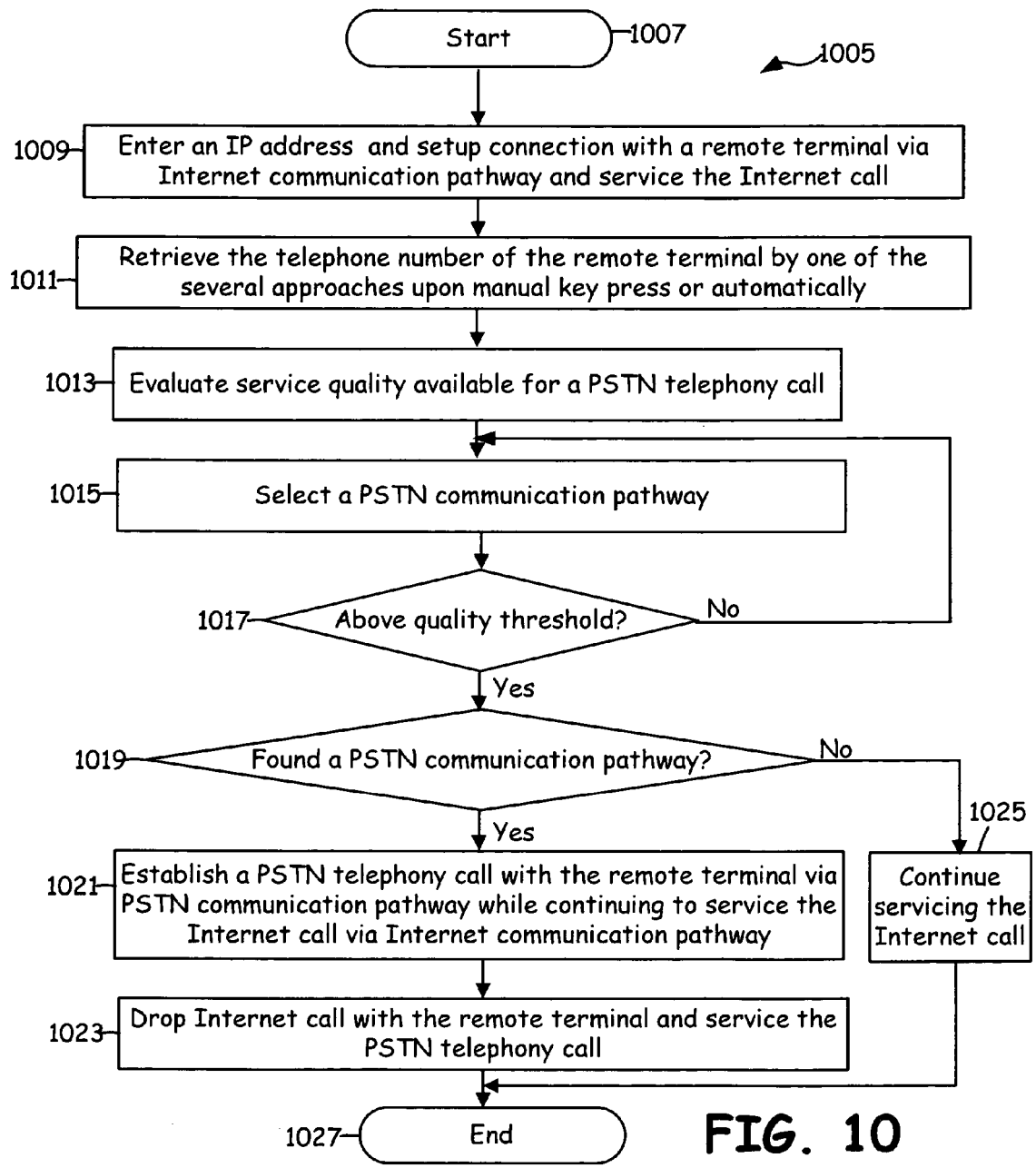
FIG. 10 is a flow diagram illustrating the method performed by a voice communication device that supports both Internet and public switched telephone network telephony during an operation of mid-call handoff from Internet communication pathway to a public switched telephone network communication pathway.

FIG. 10 is a flow diagram 1005 illustrating the method performed by a voice communication device that supports both Internet and public switched telephone network telephony during an operation of mid-call handoff from Internet communication pathway to a public switched telephone network communication pathway. The method of mid-call handoff starts at a block 1007 when the user keys in IP address of a remote terminal using the dual voice communication device and lifts the handset.

Then, at a next block 1009, the dual voice communication device sets up a connection with the remote terminal via an Internet communication pathway. Then, at the block 1009, the dual voice communication device services the call via Internet communication pathway until the user presses a HANDOFF button (described with reference to FIGS. 1 and 6) during the call. At a next block 1011, the dual voice communication device retrieves the telephone number of the remote terminal by one of the several approaches described with reference to the FIG. 1. At a next block 1013, the dual voice communication device evaluates the quality of one of several public switched telephone network communication pathways and at a block 1015 selects a public switched telephone network communication pathway.

At a next decision block 1017, the dual voice communication device determines if the selected public switched telephone network communication pathway quality is above the quality threshold. Then, at a decision block 1019, the dual voice communication device determines if a public switched telephone network communication pathway that is above the quality threshold is found. If not found, at a next block 1025, the dual voice communication device continues to service the call using the Internet communication pathway. Then, the method ends at an end block 1027.

If at the decision block 1019 a public switched telephone network communication pathway that is above quality threshold is found, then at a next block 1021, the dual voice communication device establishes a public switched telephone network call with the remote terminal using the selected public switched telephone network communication pathway, while continuing to service the Internet call. The handoff during mid-call takes place in a dead zone, without distracting the communication. Then at a next block 1023, the dual voice communication device services the call via public switched telephone network communication pathway and drops the Internet call. The method ends at a next block 1027.

As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A voice communication device that communicates with a receiving device via Internet and a public switched telephone network, the receiving device having a telephone number and an Internet identifier, the voice communication device comprising:
    a first interface that supports communication via the public switched telephone network (PSTN);
    a second interface that supports communication via the Internet;
    processing circuitry to:
        establish communication with the receiving device via the first interface;
        send a request signal via the first interface to the receiving device during setup of a PSTN call and prior to delivery of a ring signal to either one of the voice communication device and the receiving device, the request signal including a request for the Internet identifier of the receiving device;
        receive, from the receiving device during setup of a PSTN call and prior to delivery of a ring signal to either one of the voice communication device and the receiving device, a response to the request signal including communication capabilities of the receiving device;
        based on the communication capabilities of the receiving device:
            drop the communication established via the first interface; and
            establish a voice call with the receiving device via the second interface using the Internet identifier of the receiving device.

2. The voice communication device of claim 1, wherein the Internet identifier comprising an Internet address.

3. The voice communication device of claim 1, wherein the Internet identifier comprising an Internet handle that is used to retrieve an Internet address.

4. The voice communication device of claim 1, wherein the request signal comprising caller identification information.

5. The voice communication device of claim 1, wherein the request signal comprising an audible modulation signal.

6. The voice communication device of claim 5, wherein the audible modulation comprising an Internet identifier associated with the second interface.

7. A voice communication device, coupled to Internet and a public switched telephone network that communicates with a receiving device, the voice communication device comprising:
    a plurality of communication interfaces comprising a public switched telephone network (PSTN) interface coupled to the PSTN and an Internet interface; and
    processing circuitry to:
        attempt to verify an Internet identifier of the receiving device;
        in response to a failure of the verification attempt, establish a voice call with the receiving device via the PSTN interface;
        receive, prior to delivery of a ring signal, the Internet identifier of the receiving device during setup of the voice call via the PSTN interface; and
        hand off the voice call from the PSTN interface to the Internet interface, using the Internet identifier of the receiving device, to continue the voice call.

8. The voice communication device of claim 7, wherein the hand off occurs based on user input.

9. The voice communication device of claim 8, wherein the user input comprising authorization.

10. The voice communication device of claim 8, wherein the user input comprising a hand off request.

11. The voice communication device of claim 10, wherein the processing circuitry prompts for the hand off request.

12. The voice communication device of claim 7, wherein the processing circuitry performs voice pathway analysis.

13. The voice communication device of claim 7, wherein the processing circuitry considers link cost before performing the hand off.

14. A voice communication device that communicates with a remote device, the voice communication device comprising:
    a plurality of communication interfaces, the plurality of communication interfaces comprising an Internet interface and a public switched telephone network (PSTN) interface;
    processing circuitry communicatively coupled with the plurality of communication interfaces;
    the processing circuitry to:
        set up a voice call with the remote device via the PSTN interface;
        receive, prior to receipt of a ring signal, an inquiry via the PSTN interface regarding communication capabilities from the remote device;
        in response to receiving the inquiry, exchange, via the PSTN interface and prior to receipt of a ring signal, electronic information for setting up an Internet voice communication; and
        switch the voice call from the PSTN interface to the Internet interface to support a continuing call session.

15. The voice communication device of claim 14, wherein the remote device, using the information for setting up an Internet voice communication, cooperates with the processing circuitry to switch the voice call.

16. The voice communication device of claim 14, wherein the information for setting up an Internet voice communication comprising a network identifier.

17. The voice communication device of claim 16, wherein the network identifier comprising a handle.

18. The voice communication device of claim 16, wherein the network identifier comprising a telephone number.

19. The voice communication device of claim 16, wherein the network identifier comprising an Internet address.

* * * * *